(12) United States Patent
Kim et al.

(10) Patent No.: US 12,315,681 B2
(45) Date of Patent: May 27, 2025

(54) CERAMIC ELECTRONIC COMPONENT HAVING A DIELECTRIC WITH SECONDARY PHASES, METHOD OF MANUFACTURING CERAMIC ELECTRONIC COMPONENT, AND METHOD OF PRODUCING DIELECTRIC POWDER

(71) Applicant: SAMSUNG ELECTRO-MECHANICS CO., LTD., Suwon-si (KR)

(72) Inventors: Tae Yoon Kim, Suwon-si (KR); Joo Young Kim, Suwon-si (KR); Won Hyeong Kim, Suwon-si (KR); Hyung Sub Woo, Suwon-si (KR); Hyung Joon Jeon, Suwon-si (KR); Young Bin Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 123 days.

(21) Appl. No.: 17/859,557

(22) Filed: Jul. 7, 2022

(65) Prior Publication Data

US 2023/0080684 A1 Mar. 16, 2023

(30) Foreign Application Priority Data

Sep. 14, 2021 (KR) .................. 10-2021-0122734
Apr. 8, 2022 (KR) .................. 10-2022-0044143

(51) Int. Cl.
*H01G 4/30* (2006.01)
*C04B 35/468* (2006.01)
(Continued)

(52) U.S. Cl.
CPC .......... *H01G 4/30* (2013.01); *C04B 35/4682* (2013.01); *C04B 35/62655* (2013.01);
(Continued)

(58) Field of Classification Search
CPC ........ H01G 4/30; H01G 4/012; H01G 4/1209; H01G 4/1227; H01G 4/0085;
(Continued)

(56) References Cited

U.S. PATENT DOCUMENTS 5,097,391 A * 3/1992 Nomura ............... H01G 4/1281
29/25.42
2006/0046923 A1 * 3/2006 Ito ........................... H01G 4/10
501/139

(Continued)

FOREIGN PATENT DOCUMENTS

JP 2009084111 A 4/2009
JP 2012036021 A 2/2012
(Continued)

*Primary Examiner* — Nathan Milakovich
*Assistant Examiner* — Daniel M Dubuisson
(74) *Attorney, Agent, or Firm* — Morgan, Lewis & Bockius LLP

(57) ABSTRACT

A ceramic electronic component includes: a body including dielectric layers and internal electrodes; and external electrodes disposed on the body and connected to the internal electrodes, wherein the dielectric layer includes a plurality of first secondary phases, the first secondary phase is a secondary phase including Ni, Mg, Al, Si, and O, and at least one of the plurality of first secondary phases has a ratio of a major axis length to a minor axis length of 4 or more.

20 Claims, 11 Drawing Sheets

(51) Int. Cl.
*C04B 35/626* (2006.01)
*C04B 35/64* (2006.01)
*H01G 4/012* (2006.01)
*H01G 4/12* (2006.01)

(52) U.S. Cl.
CPC .............. *C04B 35/64* (2013.01); *H01G 4/012* (2013.01); *H01G 4/1209* (2013.01); *H01G 4/1227* (2013.01)

(58) Field of Classification Search
CPC .......... C04B 35/4682; C04B 35/62655; C04B 35/64; C04B 35/62818; C04B 35/62886; C04B 2235/3208; C04B 2235/3215; C04B 2235/3236; C04B 2235/441; C04B 35/465; C04B 35/49; C04B 2235/80; C04B 35/62805; C04B 35/62807; C04B 35/6281; C04B 35/62813; C04B 35/62815; C01P 2004/54; C01G 23/006
See application file for complete search history.

(56) References Cited

U.S. PATENT DOCUMENTS

| | | | | |
|---|---|---|---|---|
| 2010/0195260 | A1* | 8/2010 | Ishihara | H01G 4/30 361/313 |
| 2011/0085280 | A1 | 4/2011 | Muto et al. | |
| 2012/0033344 | A1 | 2/2012 | Nakamura | |
| 2012/0075768 | A1* | 3/2012 | Takeda | H01G 4/1227 501/137 |
| 2012/0162858 | A1* | 6/2012 | Tanaka | H01G 4/1227 361/321.4 |
| 2013/0063862 | A1* | 3/2013 | Kim | H01G 4/30 156/182 |
| 2014/0177133 | A1 | 6/2014 | Lee et al. | |
| 2015/0279565 | A1* | 10/2015 | Teraoka | H01G 4/1227 361/301.4 |
| 2016/0196919 | A1 | 7/2016 | Oguni | |
| 2018/0182548 | A1* | 6/2018 | Park | H01G 4/30 |
| 2018/0204679 | A1* | 7/2018 | Kwak | H01C 7/1006 |
| 2020/0043657 | A1* | 2/2020 | Ariizumi | H01G 4/1218 |
| 2021/0020380 | A1* | 1/2021 | Sasabayashi | H01G 4/012 |
| 2021/0061718 | A1* | 3/2021 | Iguchi | H01G 4/10 |
| 2022/0028611 | A1* | 1/2022 | Iguchi | H01G 4/30 |
| 2022/0310323 | A1* | 9/2022 | Morita | H01G 4/1227 |
| 2022/0380257 | A1* | 12/2022 | Iguchi | H01G 4/1227 |
| 2022/0392704 | A1* | 12/2022 | Iguchi | C04B 35/64 |

FOREIGN PATENT DOCUMENTS

| | | |
|---|---|---|
| JP | 5316353 B2 | 10/2013 |
| JP | 5712727 B2 | 5/2015 |
| JP | 6075457 B2 | 2/2017 |
| KR | 10-2011-0003807 A | 1/2011 |
| KR | 10-2014-0081568 A | 7/2014 |

* cited by examiner

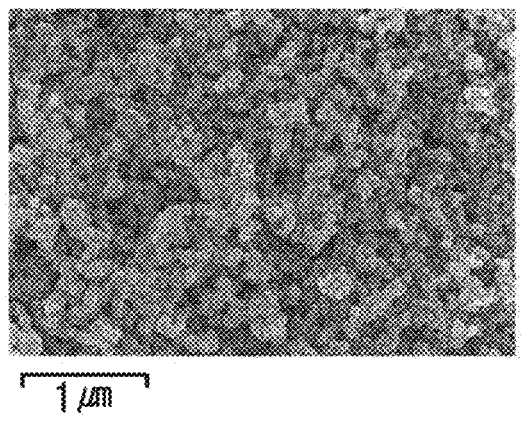
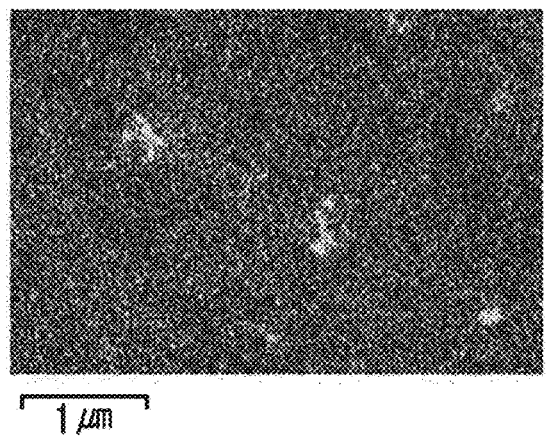
FIG. 12A  FIG. 12B
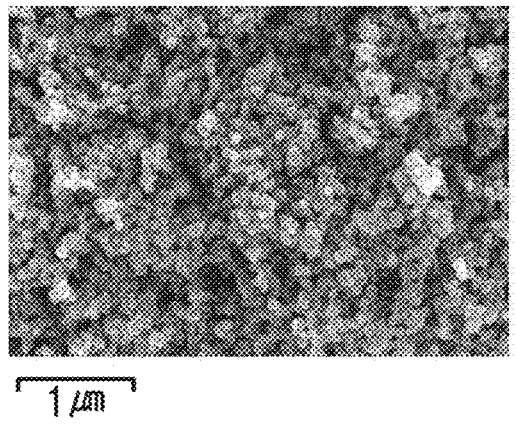
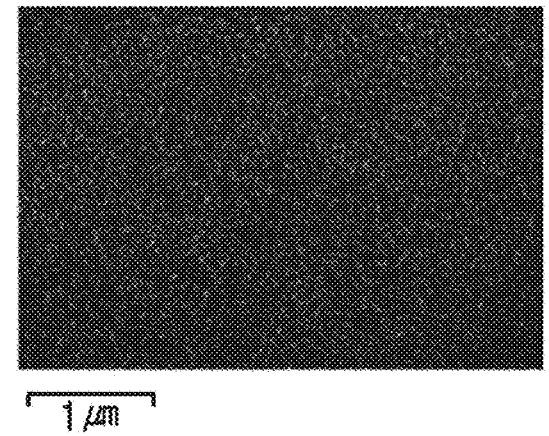
FIG. 13A  FIG. 13B

CERAMIC ELECTRONIC COMPONENT HAVING A DIELECTRIC WITH SECONDARY PHASES, METHOD OF MANUFACTURING CERAMIC ELECTRONIC COMPONENT, AND METHOD OF PRODUCING DIELECTRIC POWDER

CROSS-REFERENCE TO RELATED APPLICATION(S)

This application claims benefit of priority to Korean Patent Applications Nos. 10-2021-0122734 filed on Sep. 14, 2021 and 10-2022-0044143 filed on Apr. 8, 2022 in the Korean Intellectual Property Office, the disclosures of which are incorporated herein by reference in its entirety.

TECHNICAL FIELD

The present disclosure relates to a ceramic electronic component, a method of manufacturing a ceramic electronic component, and a method of producing a dielectric powder.

BACKGROUND

A multilayer ceramic capacitor (MLCC), a ceramic electronic component, is a chip type condenser mounted on the printed circuit boards of various types of electronic products such as an image display apparatus, including a liquid crystal display (LCD), a plasma display panel (PDP), or the like, a computer, a smartphone, and a cellular phone, to serve to charge or discharge electricity therein or therefrom.

The multilayer ceramic capacitor may be used as a component of various electronic apparatuses since it has a small size, implements a high capacitance, and may be easily mounted. Recently, in accordance with miniaturization and an increase in power of various electronic apparatuses such as a computer and a mobile device, demands for miniaturization and a high capacitance of multilayer ceramic capacitors have also increased.

In order to accomplish the miniaturization and the high capacitance of the multilayer ceramic capacitor, thicknesses of dielectric layers and internal electrodes should be decreased to increase the number of stacked dielectric layers and internal electrodes. Currently, a dielectric layer having a thickness of about 0.6 μm has been developed, and the thickness of the dielectric layer has been continuously decreased. However, as the thickness of the dielectric layer is decreased, an electric field applied to a dielectric at the same operation voltage is increased. Therefore, it is necessary to secure reliability of the dielectric.

Accordingly, the development of a structure of a dielectric having improved reliability has been demanded. In addition, atomization of a dielectric powder for forming a dielectric layer and a distribution of additives have grown in importance, and the development of a technology for a uniform distribution of additives in fine dielectric powder particles has been demanded.

SUMMARY

An aspect of the present disclosure may provide a ceramic electronic component having excellent reliability.

Another aspect of the present disclosure may provide a method of manufacturing a ceramic electronic component having excellent reliability.

Another aspect of the present disclosure may provide a method of producing a dielectric powder that may be sintered at a low temperature because a uniform coating layer is disposed therein.

According to an aspect of the present disclosure, a ceramic electronic component may include: a body including dielectric layers and internal electrodes; and external electrodes disposed on the body and connected to the internal electrodes, wherein at least one of the dielectric layers includes a plurality of first secondary phases, the first secondary phase is a secondary phase including Ni, Mg, Al, Si, and O, and at least one of the plurality of first secondary phases has a ratio of a major axis length to a minor axis length of 4 or more.

According to another aspect of the present disclosure, a method of producing a dielectric powder may include: synthesizing a dielectric material and growing grains of the dielectric material in an aqueous solution by first heat treating the aqueous solution; cooling the aqueous solution and then adding a compound including a first element to the aqueous solution; forming a coating layer including the first element on a surface of the dielectric material by second heat treating the aqueous solution; and drying the dielectric material on which the coating layer is formed.

According to another aspect of the present disclosure, a method of manufacturing a ceramic electronic component may include: synthesizing a dielectric material and growing grains of the dielectric material in an aqueous solution by first heat treating the aqueous solution; cooling the aqueous solution and then adding a compound including a first element to the aqueous solution; forming a coating layer including the first element on a surface of the dielectric material by second heat treating the aqueous solution; drying the dielectric material on which the coating layer is formed to obtain a dielectric powder; forming a ceramic green sheet using the dielectric powder; printing a conductive paste for an internal electrode on the ceramic green sheet and then stacking a plurality of the ceramic green sheets on which the conductive paste is printed to form a laminate; forming a body including dielectric layers and internal electrodes by sintering the laminate; and forming external electrodes on the body.

According to another aspect of the present disclosure, a ceramic electronic component may include: a body including dielectric layers and internal electrodes stacked in a first direction; and external electrodes disposed on the body and connected to the internal electrodes, wherein at least one of the dielectric layers includes a plurality of first secondary phases, the first secondary phase is a secondary phase including Ni, Mg, Al, Si, and O, and a ratio of an area occupied by the first secondary phases in a 10 μm×10 μm region located in a central portion of a cross section of the body cut along the first direction is more than 0.5%.

According to another aspect of the present disclosure, a method of producing a dielectric powder may include: contacting: (i) a compound including a first element and (ii) an aqueous solution in which a dielectric material is synthesized; and heat treating the aqueous solution to form the dielectric powder, wherein the dielectric powder includes a coating including the first element.

BRIEF DESCRIPTION OF DRAWINGS

The above and other aspects, features, and advantages of the present disclosure will be more clearly understood from the following detailed description taken in conjunction with the accompanying drawings, in which:

FIG. 12A is an image obtained by observing dielectric powder particles of Test No. 7 by SEM, and FIG. 12B is an image obtained by analyzing a Si distribution by SEM-EDS;

FIG. 13A is an image obtained by observing dielectric powder particles of Test No. 3 by SEM, and FIG. 13B is an image obtained by analyzing a Si distribution by SEM-EDS.

DETAILED DESCRIPTION

Figure 1:
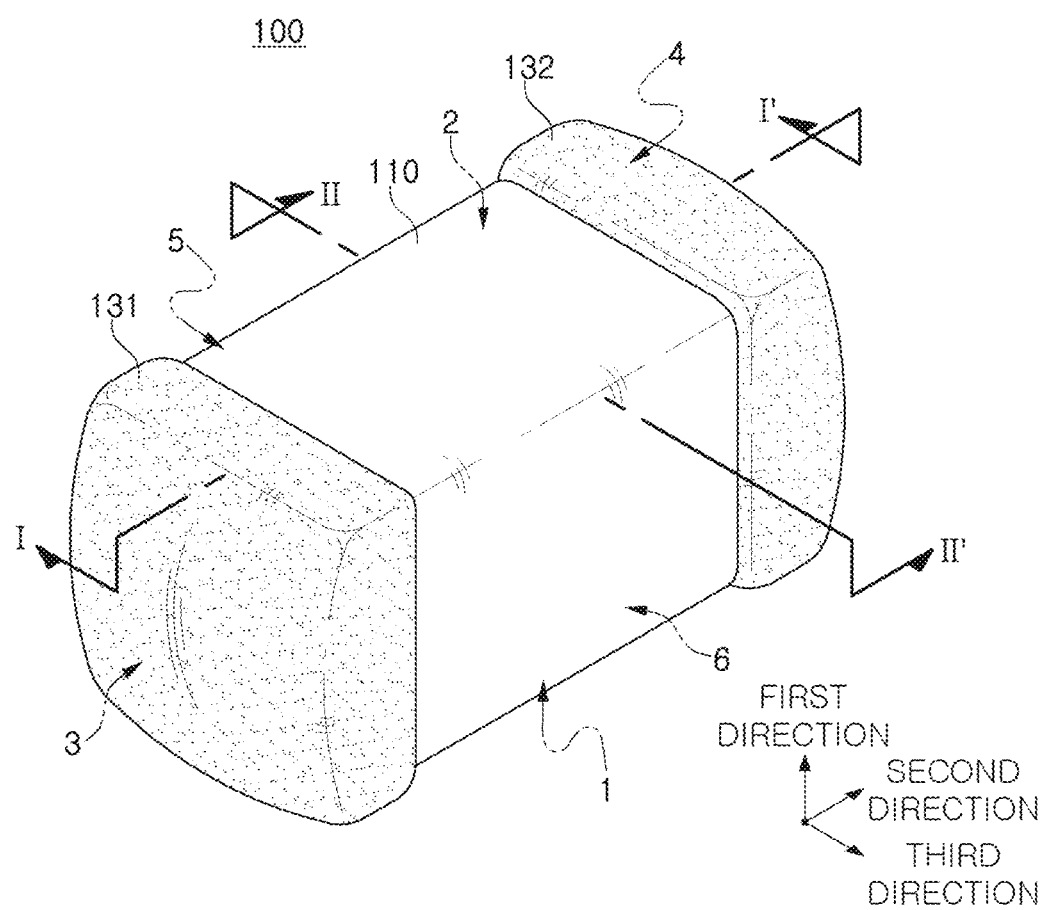
FIG. 1 is a schematic perspective view illustrating a ceramic electronic component according to an exemplary embodiment in the present disclosure.

Hereinafter, exemplary embodiments in the present disclosure will now be described in detail with reference to the accompanying drawings.

In the drawings, a first direction may be defined as a stack direction or a thickness (T) direction, a second direction may be defined as a length (L) direction, and a third direction may be defined as a width (W) direction.
Ceramic Electronic Component FIG. 1 is a schematic perspective view illustrating a ceramic electronic component according to an exemplary embodiment in the present disclosure.

Figure 2:
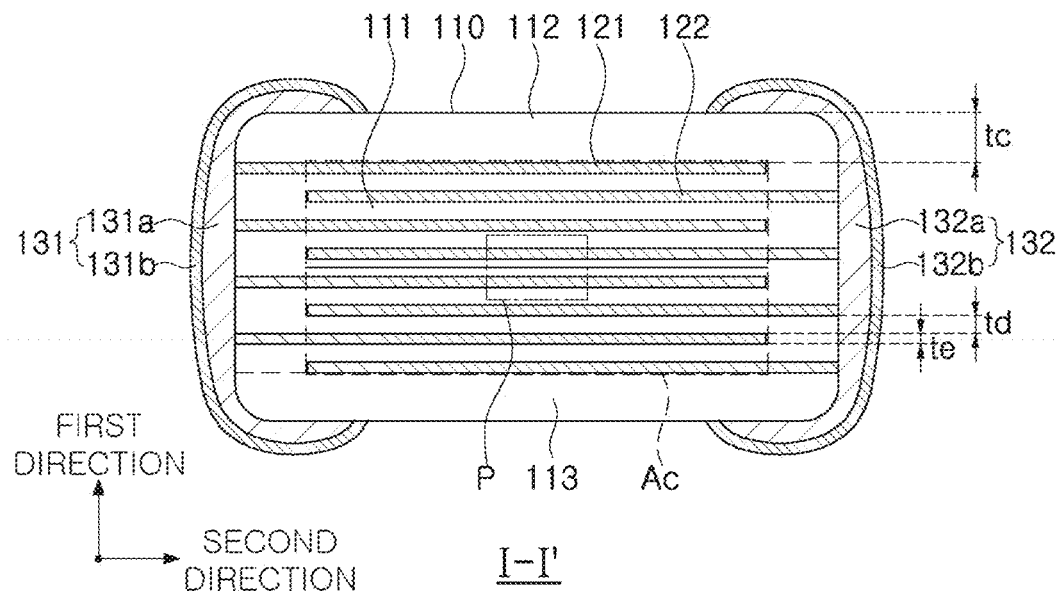
FIG. 2 is a schematic cross-sectional view taken along line I-I' of FIG. 1.

FIG. 2 is a schematic cross-sectional view taken along line I-I' of FIG. 1.

Figure 3:
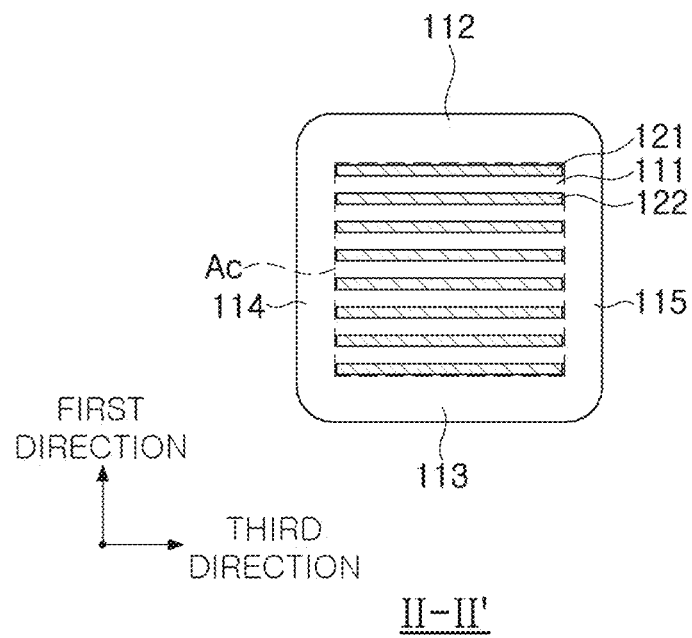
FIG. 3 is a schematic cross-sectional view taken along line II-II' of FIG. 1.

FIG. 3 is a schematic cross-sectional view taken along line II-II' of FIG. 1.

Figure 4:
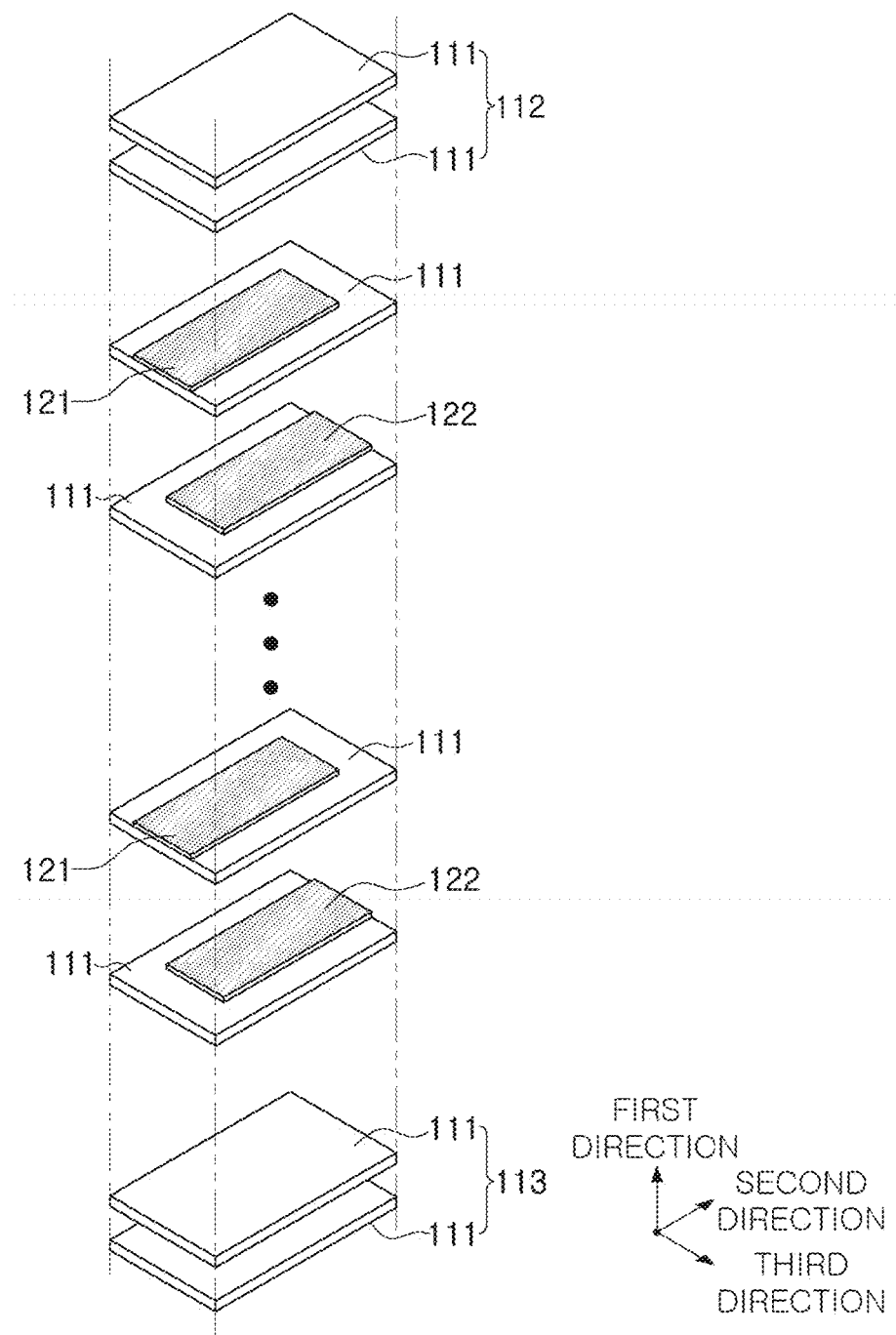
FIG. 4 is a schematic exploded perspective view illustrating a body of a ceramic electronic component according to an exemplary embodiment in the present disclosure.

FIG. 4 is a schematic exploded perspective view illustrating a body of a ceramic electronic component according to an exemplary embodiment in the present disclosure.

Figure 5:
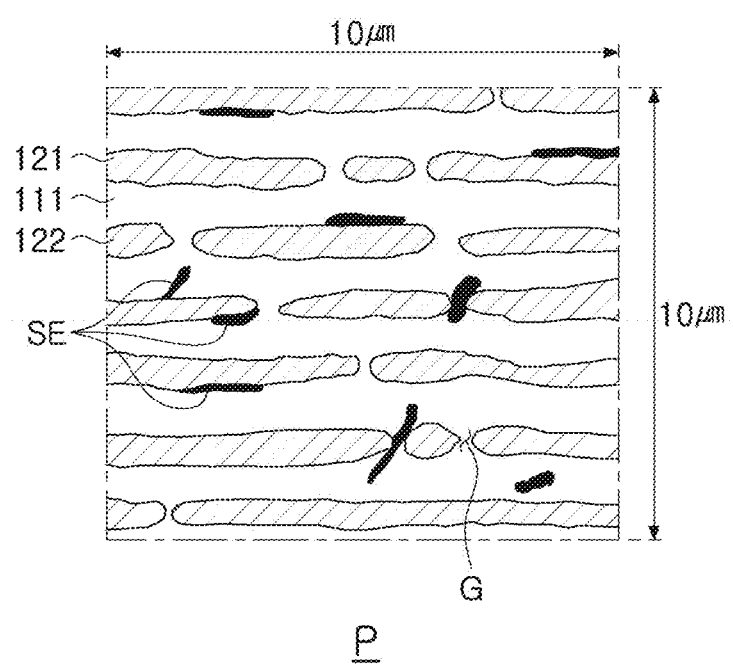
FIG. 5 is an enlarged view of region P of FIG. 2.
Figure 6A:
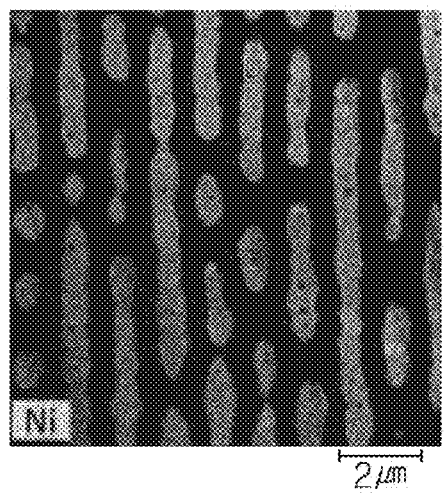
FIGS. 6A through 6E are images obtained by analyzing a capacitor of Test No. 1 by scanning electron microscope-energy dispersive X-ray spectroscopy (SEM-EDS)
Figure 6B:
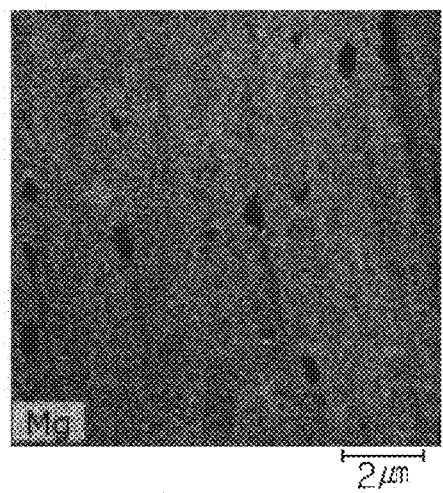
Figure 6C:
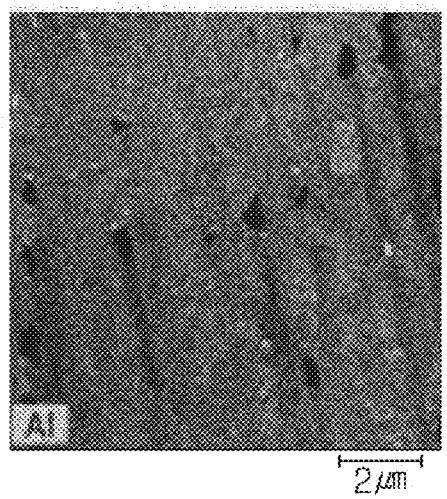
Figure 6D:
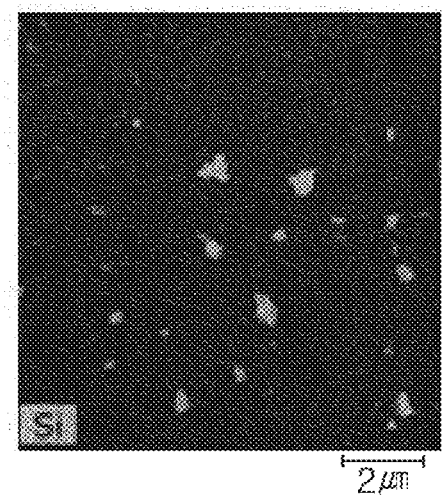
Figure 6E:
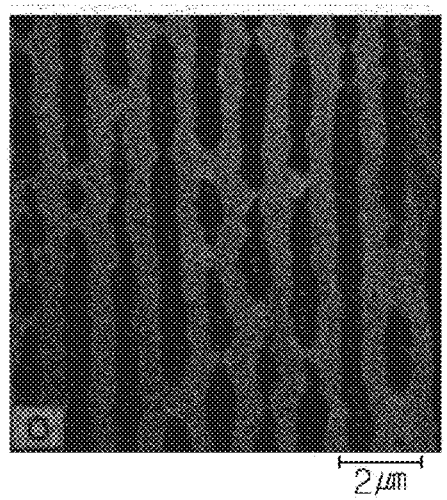
Figure 7A:
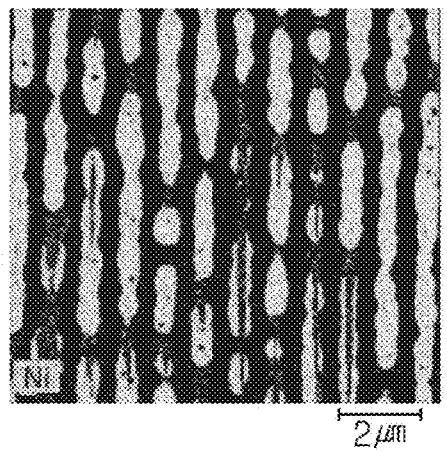
FIGS. 7A through 7E are images obtained by analyzing a capacitor of Test No. 2 by SEM-EDS.
Figure 7B:
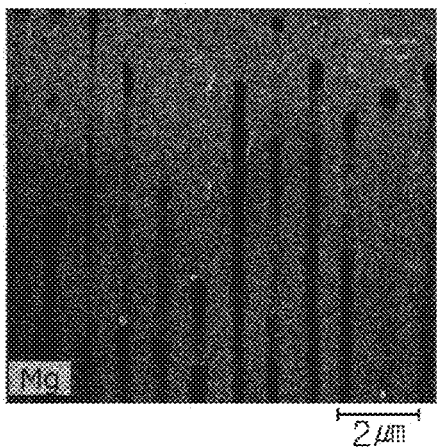
Figure 7C:
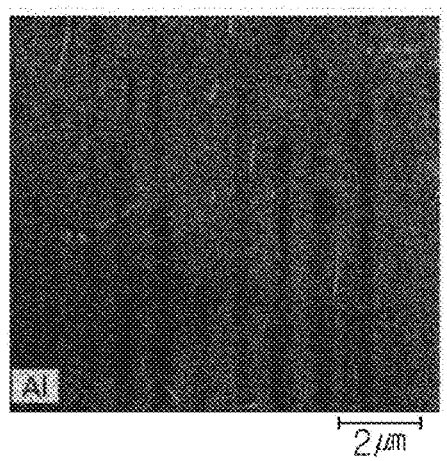
Figure 7D:
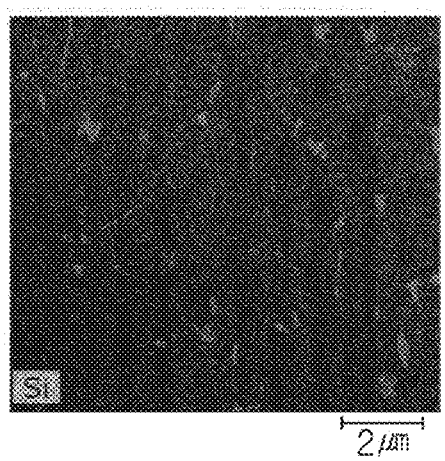
Figure 7E:
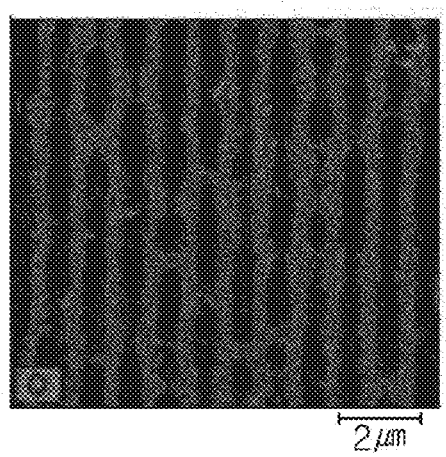
Figure 8A:
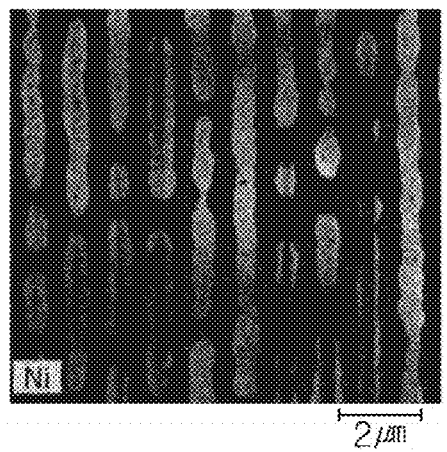
FIGS. 8A through 8E are images obtained by analyzing a capacitor of Test No. 3 by SEM-EDS.
Figure 8B:
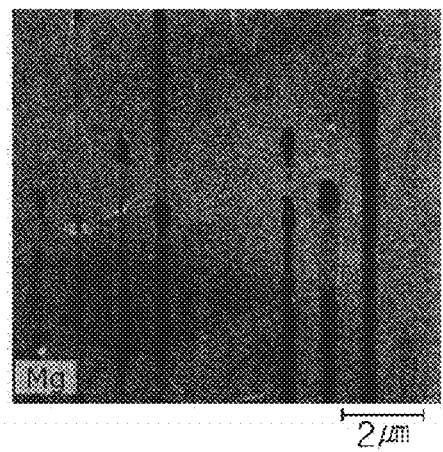
Figure 8C:
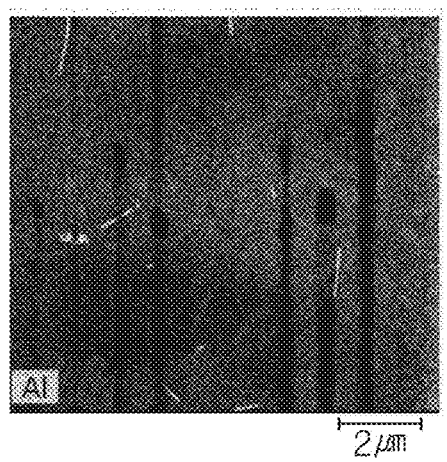
Figure 8D:
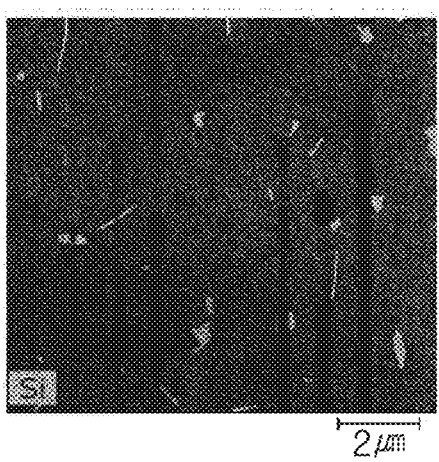
Figure 8E:
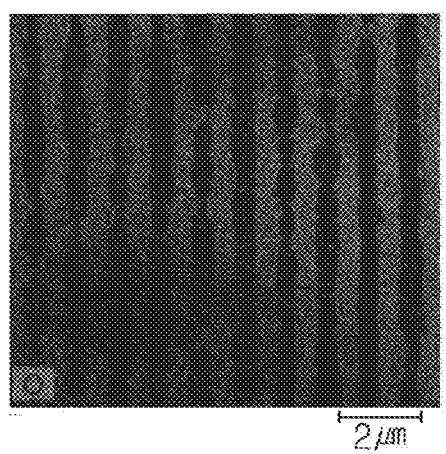
Figure 9A:
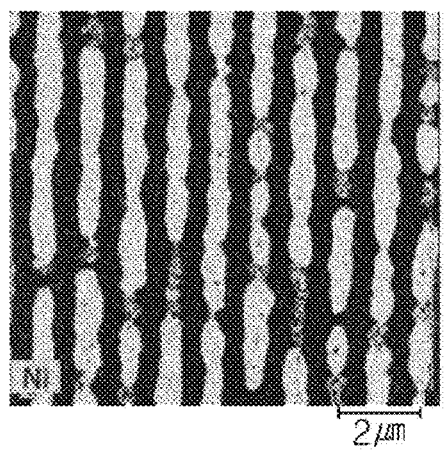
FIGS. 9A through 9E are images obtained by analyzing a capacitor of Test No. 4 by SEM-EDS.
Figure 9B:
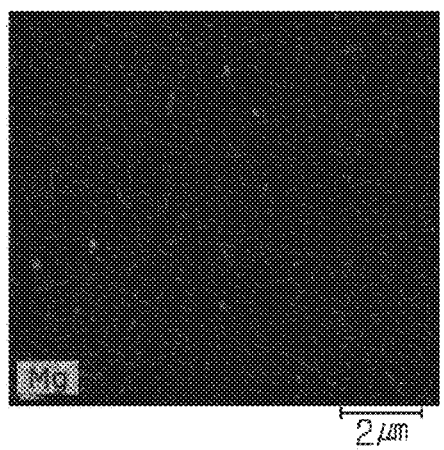
Figure 9C:
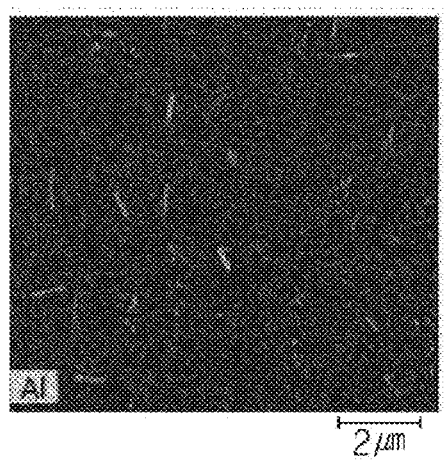
Figure 9D:
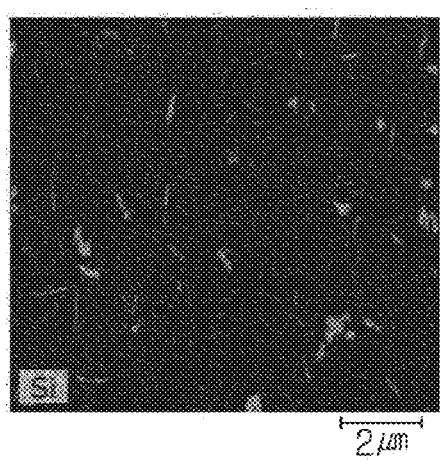
Figure 9E:
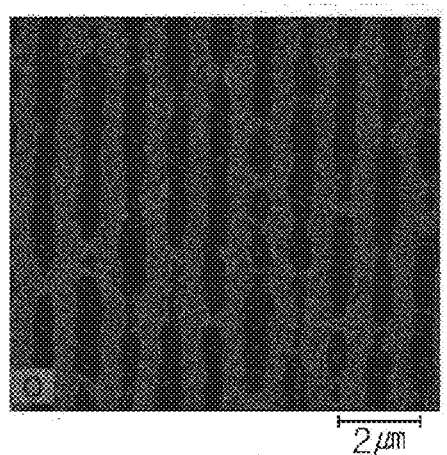

FIG. 5 is an enlarged view of region P of FIG. 2.

Hereinafter, a ceramic electronic component 100 according to an exemplary embodiment in the present disclosure will be described in detail with reference to FIGS. 1 through 5. In addition, as an example of the ceramic electronic component, a multilayer ceramic capacitor (hereinafter, referred to as "MLCC") will be described, but the present disclosure is not limited thereto. As various ceramic electronic components using a ceramic material, an inductor, a piezoelectric element, a varistor, a thermistor, and the like may be applied.

The ceramic electronic component 100 according to an exemplary embodiment in the present disclosure may include: a body 110 including dielectric layers 111 and internal electrodes 121 and 122; and external electrodes 131 and 132 disposed on the body and connected to the internal electrodes, wherein the dielectric layer 111 includes a plurality of first secondary phases SE, the first secondary phase is a secondary phase including Ni, Mg, Al, Si, and O, and at least one of the plurality of first secondary phases SE has a ratio of a major axis length to a minor axis length of 4 or more.

The dielectric layers 111 and the internal electrodes 121 and 122 may be alternately stacked in the body 110.

A specific shape of the body 110 is not particularly limited, but may be a hexahedral shape or a shape similar to the hexahedral shape, as illustrated in FIG. 1. Although the body 110 does not have a hexahedral shape having perfectly straight lines due to shrinkage of ceramic powder particles included in the body 110 in a sintering process, the body 110 may have substantially a hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, the dielectric layer 111 may include a plurality of first secondary phases SE, the first secondary phase SE is a secondary phase including Ni, Mg, Al, Si, and O, and at least one of the plurality of first secondary phases SE may have a ratio of a major axis length to a minor axis length of 4 or more.

A multilayer ceramic capacitor (MLCC), one of ceramic electronic components, has tended to have a high capacitance and a small thickness. As a thickness of the dielectric layer is decreased, an electric field load applied to grain boundaries and interfaces between the dielectric layers and the internal electrodes at the same operation voltage is increased. Therefore, it is required to secure reliability of a dielectric.

Accordingly, in the present disclosure, the secondary phases including Ni, Mg, Al, Si, and O (first secondary phases SE) are disposed in the dielectric layer 111, such that grain boundary resistance is improved to improve the reliability of the dielectric. Specifically, the dielectric layer 111 includes the plurality of first secondary phases SE, and at least one of the plurality of first secondary phases has a ratio of a major axis length to a minor axis length of 4 or more, such that one or more of a withstand voltage, an initial time to failure, and a mean time to failure (MTTF) of the ceramic electronic component 100 may be improved. Here, the term "secondary phase" may refer to a new phase precipitated after sintering the body 110. In addition, Ni, Mg, Al, Si, and O included in the first secondary phase SE may be chemically bonded to each other and may be present in a compound form, and the first secondary phase SE may be represented by Ni—Mg—Al—Si—O.

The first secondary phase SE includes all of Ni, Mg, Al, Si, and O, such that the grain boundary resistance may be improved. In particular, when the ratio of the major axis length to the minor axis length of the first secondary phase SE is 4 or more, it may have an effect on more grain boundaries, such that the grain boundary resistance may be effectively improved. In this case, the secondary phase having a ratio of a major axis length to a minor axis length of 4 or more may be defined as a needle-shaped secondary phase or a rod-shaped secondary phase.

When the first secondary phase SE does not include (is free of) at least one element of Ni, Mg, Al, Si, and O, the effect of improving the grain boundary resistance may be insufficient. Examples of the secondary phases generally observed in the dielectric layer may include a Si—O secondary phase, an Al—Si—O secondary phase, and a Ni—Mg—O secondary phase. However, these secondary phases may have less effect on improving the grain boundary resistance than the secondary phases including all of Ni, Mg, Al, Si, and O, and it may be difficult to secure the ratio of the major axis length to the minor axis length of 4 or more. Meanwhile, not all secondary phases included in the dielectric layer 111 according to an exemplary embodiment in the present disclosure may include Ni, Mg, Al, Si, and O, and the dielectric layer 111 may further include a Si—O secondary phase, an Al—Si—O secondary phase, a Ni—Mg—O secondary phase, and the like. In addition, the secondary phase including Ni, Mg, Al, Si, and O may further include elements other than Ni, Mg, Al, Si, and O.

When there is no secondary phase having a ratio of a major axis length to a minor axis length of 4 or more among the plurality of first secondary phases SE included in the dielectric layer 111, the effect of improving the grain boundary resistance may be insufficient.

A size of the first secondary phase SE is not particularly limited. For example, the minor axis length of the first secondary phase SE may be 10 to 500 nm, and the major axis length of the first secondary phase may be 100 to 2,500 nm.

In an exemplary embodiment, at least one of the plurality of first secondary phases SE included in the dielectric layer 111 may have a ratio of a major axis length to a minor axis length of 10 or more. Here, the ratio of the major axis length to the minor axis length refers to a value obtained by dividing the major axis length by the minor axis length. Therefore, it may have an effect on more grain boundaries, and thus, the grain boundary resistance may be effectively improved, such that the reliability of the dielectric may be further improved.

In an exemplary embodiment, among first secondary phases SE included in a 10 μm×10 μm region located in a central portion of a cross section of the body 110 cut in the first and second directions, the number of secondary phases having a ratio of a major axis length to a minor axis length of 4 or more may be six or more. The six or more first secondary phases SE having the ratio of the major axis length to the minor axis length of 4 or more are included in the 10 μm×10 μm region, such that the reliability of the dielectric may be further improved. More preferably, among the first secondary phases SE included in the 10 μm×10 μm region located in the central portion of the cross section of the body 110 cut in the first and second directions, the number of secondary phases having a ratio of a major axis length to the minor axis length of 4 or more may be seven or more.

In this case, among the first secondary phases SE included in the 10 μm×10 μm region, the number of secondary phases having a ratio of a major axis length to a minor axis length of 10 or more may be two or more. Therefore, the grain boundary resistance may be further improved, such that the reliability of the dielectric may be further improved.

In an exemplary embodiment, a ratio of an area occupied by the first secondary phases SE in the 10 μm×10 μm region located in the central portion of the cross section of the body 110 cut along the first direction or in the first and second directions may be 0.5% or more or more than 0.5%. That is, a value (area ratio) obtained by dividing the area occupied by the first secondary phases SE by 100 μm$^2$ and then multiplying by 100 may be 0.5 or more or more than 0.5%. Therefore, the grain boundary resistance may be further improved, such that the reliability of the dielectric may be further improved and the MTTF may be improved.

When the ratio of the area occupied by the first secondary phases SE is less than 0.5%, the effect of improving the MTTF by the first secondary phases may be insufficient.

Meanwhile, an upper limit of the ratio of the area occupied by the first secondary phases SE is not particularly limited, but it may be difficult to secure a ratio of more than 3.0% in terms of a manufacturing process. Therefore, the ratio of the area occupied by the first secondary phases SE in the 10 μm×10 μm region may be 3.0% or less.

In this case, the ratio of the area occupied by the first secondary phases SE in the 10 μm×10 μm region may be 0.9% or more. Therefore, the withstand voltage and the initial time to failure may be improved.

When the ratio of the area occupied by the first secondary phases SE is less than 0.9%, the effect of improving the withstand voltage and the initial time to failure by the first secondary phases SE may be insufficient.

In addition, the ratio of the area occupied by the first secondary phases SE in the 10 μm×10 μm region may be 1.1% or more. Therefore, the withstand voltage may be further improved, and the MTTF may be more significantly improved.

When the ratio of the area occupied by the first secondary phases SE is less than 1.1%, the effect of improving the withstand voltage by the first secondary phases SE may be insufficient.

In this case, a ratio of an area occupied by first secondary phases SE having a ratio of a major axis length to a minor axis length of 4 or more in the 10 μm×10 μm region may be 0.7% or more. In addition, a ratio of an area occupied by first secondary phases SE having a ratio of a major axis length to a minor axis length of 10 or more in the 10 μm×10 μm region may be 0.2% or more.

Furthermore, the ratio of the area occupied by the first secondary phases SE in the 10 μm×10 μm region may be 1.5% or more. Therefore, the initial time to failure may be more significantly improved.

In this case, a ratio of an area occupied by first secondary phases SE having a ratio of a major axis length to a minor axis length of 4 or more in the 10 μm×10 μm region may be 0.9% or more. In addition, a ratio of an area occupied by first secondary phases SE having a ratio of a major axis length to a minor axis length of 10 or more in the 10 μm×10 μm region may be 0.5% or more.

In an exemplary embodiment, a ratio of an area occupied by the first secondary phases SE to an area occupied by the dielectric layers in the 10 μm×10 μm region may be 1.0% or more. In this case, an upper limit of the ratio of the area occupied by the first secondary phases SE to the area occupied by the dielectric layer in the 10 μm×10 μm region is not particularly limited, and for example, may be 6% or less.

In an exemplary embodiment, the dielectric layer 111 may further include one or more second secondary phases, the second secondary phase is a secondary phase that does not include (is free of) one or more of Ni, Mg, Al, Si, and O, and a ratio of the number of first secondary phases SE to the number of all secondary phases included in the dielectric layer 111 may be 30% or more and less than 100%. The ratio of the number of first secondary phases SE to the number of all secondary phases included in the dielectric layer 111 may be preferably 50% or more and more preferably 70% or more.

The second secondary phase is not particularly limited. For example, the second secondary phase may be one or more of a Si—O secondary phase, an Al—Si—O secondary phase, and a Ni—Mg—O secondary phase.

A position where the first secondary phase SE is disposed is not particularly limited. For example, the first secondary phase SE may be disposed inside the dielectric layer so as not to be in contact with the internal electrode, may be disposed to be partially in contact with each of the internal electrodes 121 and 122, and may be disposed at the interface between each of the internal electrodes 121 and 122 and the dielectric layer 111. In addition, each of the internal electrodes 121 and 122 may have a disconnected portion G in the cross section of the body 110 cut in the first and second directions, and the first secondary phase SE may be disposed to penetrate through the disconnected portion G. In this case, when the first secondary phase SE is disposed to be partially in contact with each of the internal electrodes 121 and 122, is disposed at the interface between each of the internal electrodes 121 and 122 and the dielectric layer 111, or is disposed to penetrate through the disconnected portion G, the effect of improving the reliability of the dielectric may be further improved. A dielectric and/or a pore may be disposed at the disconnected portion G.

The area, the area ratio, the number, the shapes, and the like, of the first secondary phases SE, and the area of the dielectric layers may be measured in the 10 μm×10 μm region located in the central portion of the cross section of the body 110 cut in the first and second directions.

For example, an image is obtained by scanning the 10 μm×10 μm region by a scanning electron microscope (SEM) or a transmission electron microscope. Thereafter, a mapping image for each of the elements Ni, Mg, Al, Si, and O may be obtained from the image by scanning electron microscope-energy dispersive X-ray spectroscopy (SEM-EDS) or transmission electron microscope-energy dispersive X-ray spectroscopy (TEM-EDS), and then, the mapping image for each element may be analyzed to sort the secondary phases including all of Ni, Mg, Al, Si, and O as the first secondary phases SE and the secondary phases including only some of Ni, Mg, Al, Si, and O as the second secondary phases. Thereafter, the area, the area ratio, the number, the shapes, and the like, of the first secondary phases SE, and the number of second secondary phases may be measured using image analysis program. Scanpro may be used as the image analysis program. A maximum size of the first secondary phase SE is defined as the major axis length, a length corresponding to a straight line orthogonal to the major axis at the center of the first secondary phase is defined as the minor axis length, and a value obtained by dividing the major axis length by the minor axis length may be obtained as the ratio of the major axis length to the minor axis length of the first secondary phase SE. In addition, the area ratio, the number, and the like, of the first secondary phases may be more generalized by averaging values measured in three or more regions having a size of 10 μm×10 μm.

Meanwhile, according to an exemplary embodiment in the present disclosure, a raw material forming the dielectric layer 111 is not particularly limited as long as a sufficient capacitance may be obtained. For example, a barium titanate-based material, a lead composite perovskite-based material, a strontium titanate-based material, or the like may be used. An example of the barium titanate-based material may include a $BaTiO_3$-based ceramic powder. Examples of the ceramic powder may include $BaTiO_3$, and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), or $Ba(Ti_{1-y}Zr_y)O_3$ (0<y<1) that is formed by partially solid-dissolving calcium (Ca), zirconium (Zr), or the like, in $BaTiO_3$.

In addition, a raw material forming the dielectric layer 111 may be prepared by adding various ceramic additives, organic solvents, binders, dispersants, and the like, to a powder such as a barium titanate ($BaTiO_3$) powder, according to an object of the present disclosure.

In addition, a method of forming the first secondary phase SE is not particularly limited. As a preferred example for easily forming the first secondary phase SE, a dielectric powder in which a coating layer including a composite phase of Ba and Si is disposed may be used to form a first secondary phase SE. In addition, the area ratio, the number, and the like, of the first secondary phases SE may be controlled by controlling uniformity and a content of Si in the coating layer of the dielectric powder.

In an exemplary embodiment, the dielectric layer includes a plurality of dielectric grains, and a coefficient of variation (CV) value of a dielectric grain size may be 0.21% or less. Therefore, the withstand voltage, the initial time to failure, and the MTTF may be further improved.

A method of measuring the CV value of the dielectric grain size is not particularly limited. As a specific example, a CV value may be calculated by measuring sizes of five hundred or more dielectric grains in the image obtained by scanning the central portion of the cross section of the body 110 cut in the first and second directions by a scanning electron microscope (SEM). However, in the measurement, it is not required to adjust a magnification so that five hundred or more dielectric grains are included in one image, and the measurement may be performed in a plurality of images by adjusting the magnification so that the total number of dielectric grains included in the plurality of images is five hundred or more.

The dielectric grain size may refer to a Feret diameter of each dielectric grain obtained in the image using Zootos or Scanpro as grain diameter measurement software. Thereafter, an average and a standard deviation of sizes of five hundred or more dielectric grains are calculated, and "(Standard deviation/Average)×100" may be defined as a CV value (%). In this case, the standard deviation may be a value calculated using the STDEVP function in Microsoft Excel software, and the average may refer to an arithmetic mean.

Meanwhile, a thickness td of the dielectric layer 111 is not particularly limited.

However, in general, when the dielectric layer is thinly formed to a thickness of less than 0.6 μm, in particular, when the thickness of the dielectric layer is 0.4 μm or less, the reliability of the dielectric may be reduced.

As described above, according to an exemplary embodiment in the present disclosure, the dielectric layer includes the plurality of first secondary phases SE, and at least one of the plurality of first secondary phases has a ratio of a major axis length to a minor axis length of 4 or more, such that the grain boundary resistance may be improved, thereby improving the reliability of the dielectric. Thus, even when the thickness of the dielectric layer 111 is 0.4 µm or less, excellent reliability of the dielectric may be secured.

Therefore, when the thickness of the dielectric layer 111 is 0.4 µm or less, the effect of improving the reliability of the dielectric according to the present disclosure may be more significantly exerted.

The thickness td of the dielectric layer 111 may refer to an average thickness of the dielectric layers 111 disposed between the first and second internal electrodes 121 and 122.

The average thickness of the dielectric layers 111 may be calculated by scanning an image of a cross section of the body 110 in length and thickness (L-T) directions by a scanning electron microscope (SEM) with a magnification of 10,000×. More specifically, an average thickness may be calculated from the scanned image by measuring thicknesses of one dielectric layer at thirty points arranged at equal intervals in the length direction. The thirty points arranged at equal intervals may be selected in a capacitance forming portion Ac. In addition, when an average thickness of ten dielectric layers is calculated, the average thickness of the dielectric layers may be further generalized.

The body 110 may include the capacitance forming portion Ac disposed inside the body 110 and including first internal electrodes 121 and second internal electrodes 122 disposed to face each other with each of the dielectric layers 111 interposed therebetween to form a capacitance, and cover portions 112 and 113 formed on an upper surface and a lower surface of the capacitance forming portion Ac, respectively, in the first direction.

In addition, the capacitance forming portion Ac, which is a portion contributing to form a capacitance of a capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction.

The upper and lower cover portions 112 and 113 may be formed by stacking a single dielectric layer or two or more dielectric layers on the upper and lower surfaces of the capacitance forming portion Ac, respectively, in a thickness direction, and may basically serve to prevent damage to the internal electrodes due to physical or chemical stress.

The upper and lower cover portions 112 and 113 may not include internal electrodes, and may include the same material as that of the dielectric layer 111.

That is, the upper and lower cover portions 112 and 113 may include a ceramic material such as a barium titanate ($BaTiO_3$)-based ceramic material.

Meanwhile, a thickness of each of the cover portions 112 and 113 is not particularly limited. However, in order to easily accomplish miniaturization and a high capacitance of the ceramic electronic component, a thickness tc of each of the cover portions 112 and 113 may be 20 µm or less.

In addition, side margin portions 114 and 115 may be disposed on side surfaces of the capacitance forming portion Ac.

The side margin portions 114 and 115 may include a side margin portion 114 disposed on the fifth surface 5 of the body 110 and a side margin portion 115 disposed on the sixth surface 6 of the body 110. That is, the side margin portions 114 and 115 may be disposed on both side surfaces of the body 110 in the width direction.

The side margin portions 114 and 115 may refer to regions between both ends of the first and second internal electrodes 121 and 122 and a boundary surface of the body 110 in a cross section of the body 110 cut in a width-thickness (W-T) direction, as illustrated in FIG. 3.

The side margin portions 114 and 115 may basically serve to prevent damage to the internal electrodes due to physical or chemical stress.

The side margin portions 114 and 115 may be formed by applying a conductive paste to a ceramic green sheet, except for a region in which the side margin portion is to be formed, to form an internal electrode on the ceramic green sheet.

In addition, in order to prevent a step from being formed by the internal electrodes 121 and 122, after the internal electrodes are stacked and then cut out to be exposed to the fifth and sixth surfaces 5 and 6 of the body, a single dielectric layer or two or more dielectric layers may be stacked on both side surfaces of the capacitance forming portion Ac in the width direction to form the side margin portions 114 and 115.

The internal electrodes 121 and 122 and the dielectric layers 111 may be alternately stacked.

The internal electrodes 121 and 122 may include the first and second internal electrodes 121 and 122. The first and second internal electrodes 121 and 122 may be alternately disposed to face each other with each of the dielectric layers 111 interposed therebetween, and may be exposed to the third and fourth surfaces 3 and 4 of the body 110, respectively.

Referring to FIG. 2, the first internal electrodes 121 may be spaced apart from the fourth surface 4 and be exposed through the third surface 3, and the second internal electrodes 122 may be spaced apart from the third surface 3 and be exposed through the fourth surface 4.

In this case, the first and second internal electrodes 121 and 122 may be electrically insulated from each other by each of the dielectric layers 111 disposed therebetween.

Referring to FIG. 4, the body 110 may be formed by alternately stacking ceramic green sheets on which the first internal electrodes 121 are printed and ceramic green sheets on which the second internal electrodes 122 are printed to form a laminate and then sintering the laminate.

The internal electrodes 121 and 122 may include Ni. A material forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing, on a ceramic green sheet, a conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof. As a method of printing the conductive paste for an internal electrode, a screen-printing method, a gravure printing method, or the like may be used, but the present disclosure is not limited thereto.

Meanwhile, a thickness to of each of the internal electrodes 121 and 122 is not particularly limited.

However, in general, when the internal electrode is thinly formed to a thickness of less than 0.6 µm, in particular, when the thickness of the internal electrode is 0.4 µm or less, the reliability of the dielectric may be reduced.

As described above, according to an exemplary embodiment in the present disclosure, the dielectric layer includes the plurality of first secondary phases SE, and at least one of the plurality of first secondary phases has a ratio of a major axis length to a minor axis length of 4 or more, such that the grain boundary resistance may be improved, thereby improving the reliability of the dielectric. Therefore, even when the thickness of each of the internal electrodes 121 and 122 is 0.4 μm or less, excellent reliability of the dielectric may be secured.

Therefore, when the thickness of each of the internal electrodes 121 and 122 is 0.4 μm or less, the effects according to the present disclosure may be more significantly exerted, and the miniaturization and the high capacitance of the ceramic electronic component may be more easily accomplished.

The thickness to of each of the internal electrodes 121 and 122 may refer to an average thickness of the internal electrodes 121 and 122.

The average thickness of the internal electrodes 121 and 122 may be calculated by scanning an image of the cross section of the body 110 in the length and thickness (L-T) directions by a scanning electron microscope (SEM) with a magnification of 10,000×. More specifically, an average thickness may be calculated from the scanned image by measuring thicknesses of one internal electrode at thirty points arranged at equal intervals in the length direction. The thirty points arranged at equal intervals may be selected in the capacitance forming portion Ac. In addition, when an average thickness of ten internal electrodes is calculated, the average thickness of the internal electrodes may be further generalized.

The external electrodes 131 and 132 may be disposed on the third and fourth surfaces 3 and 4 of the body 110, respectively.

The external electrodes 131 and 132 may be disposed on the third and fourth surfaces 3 and 4 of the body 110, respectively, and may include the first and second external electrodes 131 and 132 connected to the first and second internal electrodes 121 and 122, respectively.

Referring to FIG. 1, the external electrodes 131 and 132 may be disposed to cover both end surfaces of the side margin portions 114 and 115 in the second direction.

A structure in which the ceramic electronic component 100 includes two external electrodes 131 and 132 is described in the present exemplary embodiment, but the number, shapes, and the like, of the external electrodes 131 and 132 may be changed depending on shapes of the internal electrodes 121 and 122 or other purposes.

Meanwhile, the external electrodes 131 and 132 may be formed of any material having electrical conductivity, such as a metal, a certain material of each of the external electrodes 131 and 132 may be determined in consideration of electrical characteristics, structural stability, or the like, and the external electrodes 131 and 132 may have a multi-layer structure.

For example, the external electrodes 131 and 132 may include electrode layers 131a and 132a disposed on the body 110, and plating layers 131b and 132b formed on the electrode layers 131a and 132a, respectively.

As a more specific example, each of the electrode layers 131a and 132a may be a sintered electrode including a conductive metal and glass, or a resin-based electrode including a conductive metal and a resin.

In addition, each of the electrode layers 131a and 132a may be formed by sequentially forming a sintered electrode and a resin-based electrode on the body. In addition, each of the electrode layers 131a and 132a may be formed by transferring a sheet including a conductive metal on the body, or may be formed by transferring a sheet including a conductive metal on a sintered electrode.

A material having excellent electrical conductivity may be used as the conductive metal included in the electrode layers 131a and 132a. However, the material of the conductive metal is not particularly limited. For example, the conductive metal may be one or more of nickel (Ni), copper (Cu), and an alloy thereof.

The plating layers 131b and 132b may serve to improve mounting characteristics. Types of the plating layers 131b and 132b are not particularly limited. Each of the plating layers 131b and 132b may be a plating layer including one or more of Ni, Sn, Pd, and alloys thereof, or may include a plurality of layers.

As a more specific example, each of the plating layers 131b and 132b may be a Ni plating layer or a Sn plating layer, may be formed by sequentially forming a Ni plating layer and a Sn plating layer on each of the electrode layers 131a and 132a, and may be formed by sequentially forming a Sn plating layer, a Ni plating layer, and a Sn plating layer on each of the electrode layers 131a and 132a. In addition, each of the plating layers 131b and 132b may include a plurality of Ni plating layers and/or a plurality of Sn plating layers.

A size of the ceramic electronic component 100 is not particularly limited.

However, in order to accomplish both the miniaturization and the high capacitance, the thicknesses of the dielectric layers and the internal electrodes should be decreased to increase the number of stacked dielectric layers and internal electrodes. When the ceramic electronic component 100 has a 1005 size (length×width, 1.0 mm×0.5 mm) or less, the effect of improving the reliability of the dielectric and insulation resistance according to the present disclosure may be more significantly exerted.

Therefore, considering a manufacturing error, an external electrode size, and the like, when the ceramic electronic component 100 has a length of 1.1 mm or less and a width of 0.55 mm or less, the effect of improving the reliability according to the present disclosure may be more significantly exerted. Here, the length of the ceramic electronic component 100 refers to the size of the ceramic electronic component 100 in the second direction, and the width of the ceramic electronic component 100 refers to the size of the ceramic electronic component 100 in the third direction.

Method of Producing Dielectric Powder

Hereinafter, a method of producing a dielectric powder by which the ceramic electronic component 100 may be more easily manufactured, which is used in the method of manufacturing a ceramic electronic component 100 according to an exemplary embodiment in the present disclosure, will be described.

It should be noted that the dielectric powder used in the method of manufacturing a ceramic electronic component according to an exemplary embodiment in the present disclosure is not limited to a dielectric powder produced by a production method described below. In addition, a description for contents that are the same contents as described above will be omitted in order to avoid an overlapping description.

When a ceramic green sheet is manufactured using a dielectric powder, an additive is added to implement electrical properties and sinterability. As a method of adding the additive, in general, a method of dispersing additives together with the dielectric powder particles in a solvent and then forming a ceramic green sheet by a casting method is used. Recently, in accordance with miniaturization and a high capacitance of a ceramic electronic component, a dielectric powder has been atomized. However, it is difficult to secure uniformity of a distribution of the additives due to agglomeration and a decrease in dispersibility of the dielectric powder particles caused by a decrease in specific surface area. In addition, as the dielectric powder is more atomized, the influence of the uniform distribution of the additives on the implementation of the characteristics of the ceramic electronic component is increased.

Therefore, the atomization of the dielectric powder for forming a dielectric layer and the distribution of the additives have grown in importance in order to secure reliability of the dielectric layer, and the development of a technology for a uniform distribution of additives in fine dielectric powder particles has been demanded.

In a case where the additive is coated to the dielectric powder, uniformity of the distribution of the additives may be implemented to some degree. However, in the case of the existing additive coating method, there is a limitation in uniformly distributing the additives in a plurality of dielectric powder particles due to agglomeration of some additives.

Therefore, the present disclosure is to provide a method of producing a dielectric powder in order to uniformly distribute additives in a plurality of dielectric powder particles in production of the dielectric powder. In the method of producing a dielectric powder according to an exemplary embodiment in the present disclosure, grain growth of a dielectric material is performed in an aqueous solution, a coating material is added to the aqueous solution, and dispersion and coating are performed by heat treatment. Therefore, the additives may be uniformly distributed throughout a plurality of dielectric powder particles to be produced.

The method of producing a dielectric powder according to an exemplary embodiment in the present disclosure may include: performing synthesis and grain growth of a dielectric material in an aqueous solution by heat treatment; cooling the aqueous solution and then adding a compound including a first element to the aqueous solution; forming a coating layer including the first element on a surface of the dielectric material by performing a heat treatment on the aqueous solution; and drying the dielectric material on which the coating layer is formed.

Synthesis and Grain Growth of Dielectric Material

Figures 10A, 10B, 10C:
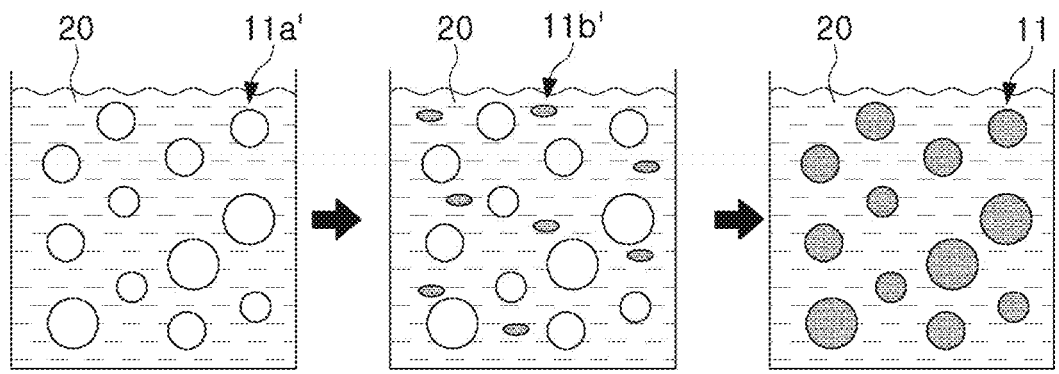
FIGS. 10A through 10C are views illustrating a method of producing a dielectric powder according to an exemplary embodiment in the present disclosure.

Referring to FIG. 10, synthesis and grain growth of a dielectric material $11a'$ are performed in an aqueous solution 20 by heat treatment (e.g., first heating the aqueous solution).

A method of performing synthesis and grain growth of the dielectric material $11a'$ may be performed using a hydrothermal synthesis method. The hydrothermal synthesis method refers to a synthesis method of a dielectric powder in which a homogeneous aqueous solution or precursor suspension is heated and pressurized to perform synthesis and grain growth of a dielectric powder through a liquid-phase reaction of a metal salt. A heat treatment temperature in the grain growth is not particularly limited. For example, the heat treatment may be performed at 180 to 350° C.

In an exemplary embodiment, the dielectric material $11a'$ may be $BaTiO_3$. As a specific example, a $TiO_2$ sol and $Ba(OH)_2$ are mixed to synthesize a seed BT having a size of about 10 nm through a nucleation reaction, grain growth of the seed BT is performed to obtain a desired size by Ostwald ripening in a high-temperature, high-pressure, and alkaline environment. Ostwald ripening is a phenomenon in which surface energy of particles acts as a driving force and smaller particles in a dispersion system become smaller or disappear to grow into larger particles.

However, the dielectric material is not limited to $BaTiO_3$, and the dielectric material may be a $BaTiO_3$-based material. For example, the dielectric material $11a'$ may be one or more of $BaTiO_3$, and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), or $Ba(Ti_{1-y}Zr_y)O_3$ (0<y<1) that is formed by partially solid-dissolving calcium (Ca), zirconium (Zr), or the like, in $BaTiO_3$.

A pH of the aqueous solution 20 may be 7 or more. That is, the aqueous solution 20 may be alkaline and may include water. As the aqueous solution 20 is alkaline, the grain growth of the dielectric material may be smoothly performed. In addition, environmental pollution may be prevented by using the aqueous solution instead of an organic solution.

Coating Material Addition and Coating Layer Formation

Thereafter, the aqueous solution 20 is cooled, and then, a compound $11b'$ including a first element may be added to the aqueous solution 20. In this case, the aqueous solution 20 may be cooled to room temperature. For example, the aqueous solution 20 may be cooled to 25° C.

Since the compound $11b'$ including the first element that is a coating material is added after the grain growth of the dielectric material $11a'$, the influence of formation of a coating layer on crystallinity of the dielectric material $11a'$ may be minimized, such that the crystallinity of the dielectric material $11a'$ may be improved, and a dielectric constant of the dielectric layer 111 may be improved.

Thereafter, a coating layer $11b$ including the first element may be formed on a surface of the dielectric material $11a'$ by performing a heat treatment on (e.g., second heat treating) the aqueous solution 20 including the compound $11b'$ including the first element.

According to the present disclosure, after the addition of the compound $11b'$ including the first element, dispersion and coating are performed by heat treatment. Therefore, pre-dispersion and pre-treatment processes are not required for the compound $11b'$ including the first element, which is advantageous in implementing a simple manufacturing process. In some embodiments, before the contacting, the method may exclude dispersing the compound in a solvent to form a sol. In addition, the coating layers may be uniformly formed in a plurality of dielectric powder particles in comparison to a case where the first element in a sol form subjected to pre-dispersion is added, and the first elements may be uniformly distributed. In addition, the first elements are uniformly distributed in the plurality of dielectric powder particles, such that first secondary phases SE may be easily formed, thereby improving reliability of the ceramic electronic component.

In an exemplary embodiment, the compound $11b'$ including the first element may be alkoxide. Alkoxide is the generic term for a compound in which a hydrogen atom of a hydroxyl group (—OH) of an alcohol is substituted with a metal atom. The alkoxide may be hydrolyzed by heat treatment and may be easily coated to the dielectric material $11a'$. Examples of the alkoxide include $Si(OR)_4$, $Mg(OR)_2$, $Al(OR)_3$, $VO(OR)_3$, $Ca(OR)_2$, $Cu(OR)_2$, $Dy(OR)_3$, $Nb(OR)_5$, $Gd(OR)_3$, $Sm(OR)_3$, $Hf(OR)_4$, $Sn(OR)_4$, and $Sn(OR)_2$. Here, R may be $C_2H_5$.

In an exemplary embodiment, the heat treatment may be performed while maintaining the aqueous solution at a temperature of 100° C. or higher for 30 minutes or longer. The aqueous solution is maintained at a temperature of 100° C. or higher for 30 minutes or longer, such that the hydrolysis of the compound including the first element may be sufficiently performed. In some embodiments, the heat treatment in the forming of the coating layer includes a hydrothermal synthesis method.

An upper limit of each of the heat treatment temperature and the maintenance time is not particularly limited, and the heat treatment temperature and the maintenance time may be appropriately controlled depending on a content and a type of the compound $11b'$ including the first element. For example, the upper limit of the heat treatment temperature may be 250° C.

In an exemplary embodiment, the heat treatment temperature in the forming of the coating layer may be lower than the heat treatment temperature in the grain growth. Therefore, additional grain growth of the dielectric material $11a'$ is prevented in the formation of the coating layer, such that the influence of the formation of the coating layer on the crystallinity of the dielectric material $11a'$ may be minimized, thereby improving the crystallinity of the dielectric material $11a'$ and the dielectric constant of the dielectric layer 111.

In an exemplary embodiment, the first element may be one or more of Si, Mg, Mn, Al, V, Ca, Li, Cu, Dy, Tb, Nb, Sm, and Gd.

As a specific example, the first element may be Si, and the compound $11b'$ including the first element may be $Si(OR)_4$. $Si(OR)_4$ is alkoxide and is referred to as tetraethoxy orthosilane (TEOS). Here, R may be $C_2H_5$.

When the heat treatment is performed after the addition of $Si(OR)_4$ to the aqueous solution, a hydrolysis reaction represented by the following Equation 1 proceeds, a condensation polymerization reaction represented by the following Equation 2 proceeds, and then, a neutralization reaction represented by the following Equation 3 proceeds, such that the coating layer $11b$ including Si may be formed on the surface of the dielectric material $11a'$. Equation 4 is a rate equation of the coating layer including Si, and represents that concentrations of $H_2O$, $OH-$, and TEOS, and a temperature have an influence on the decomposition of TEOS and the formation of the coating layer.

$$Si(OR)_4 + xH_2O \overset{K1}{\leftrightarrow} Si(OH)_4(OR)_{4-x} + xROH \quad \text{[Equation 1]}$$

$$Si(OH)_4 \overset{K2}{\leftrightarrow} SiO_2 + H_2O \quad \text{[Equation 2]}$$

$$SiO_2 + Ba(OH)_2 \overset{K3}{\leftrightarrow} H_2O + BaSiO_3 \quad \text{[Equation 3]}$$

$$\frac{d[TEOS]}{dt} = -k1[H_2O][OH^-][TEOS] \quad \text{[Equation 4]}$$

The coating layer $11b$ including Si may include a composite phase of Ba and Si. In addition, the coating layer $11b$ including Si may further include a Si oxide, a composite phase of Ti and Si, and the like. As the coating layer $11b$ includes the composite phase of Ba and Si, a liquid phase may be easily formed during sintering of the dielectric, such that a shrinkage start temperature of the dielectric powder may be lowered and high reliability of the ceramic electronic component may be secured. In addition, as the coating layer $11b$ includes the composite phase of Ba and Si, a sintering end point may be delayed due to an increase in solid-solution temperature of the additive, such that a first secondary phase SE may be easily formed. Here, the Si oxide may be $SiO_2$ formed by the condensation polymerization reaction, and the composite phase of Ba and Si may be $BaSiO_3$ formed by the neutralization reaction.

Figure 14:
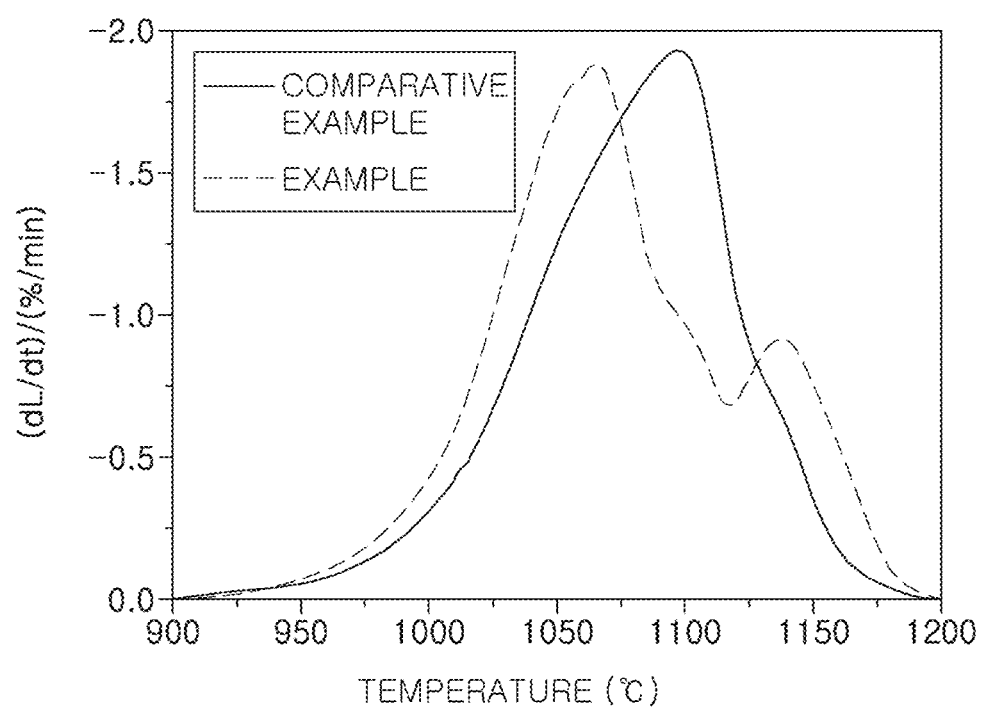
FIG. 14 is a graph showing rates of change of shrinkage depending on a change in temperature of an example according to the present disclosure and a comparative example.

FIG. 14 is a graph showing rates of change of shrinkage of a dielectric powder including a core including $BaTiO_3$ and a coating layer disposed on a surface of the core and including a composite phase of Ba and Si (Example) and a $BaTiO_3$ dielectric powder in which a coating layer is not disposed (Comparative Example) depending on a change in temperature. It may be confirmed that, as the composite phase of Ba and Si is included, a shrinkage start temperature of the example is decreased in comparison to that of the comparative example, and limited solid-solution of the additive occurs, but as the solid-solution temperature of the additive is increased due to an increase in temperature, an inflection point of the rate of change of shrinkage is observed near 1,120° C. That is, it is determined that the shrinkage start temperature is lowered and the sintering end point is delayed, and thus, the first secondary phase SE may be easily formed.

After the coating layer $11b$ is formed, the dielectric material is subjected to drying to remove moisture, such that a dielectric powder 11 including a core $11a$ including a dielectric material and a coating layer $11b$ disposed on a surface of the core and including a first element may be produced.

In a case where an image of a plurality of dielectric powder particles 11 produced after the drying is obtained at a magnification of 30 k by an SEM, and then, the first element is analyzed by SEM-EDS, a maximum size of a region in which the first elements agglomerate may be 100 nm or less. The reason is that in the method of producing a dielectric powder according to an exemplary embodiment in the present disclosure, the grain growth of the dielectric material is performed in the aqueous solution, the coating material is added to the aqueous solution, and the dispersion and coating are performed by heat treatment, such that the first elements may be uniformly distributed throughout the plurality of dielectric powder particles to be produced.

In addition, a change in particle size of the dielectric powder 11 according to the formation of the coating layer $11b$ is not large, but a specific surface area may be reduced due to a change in surface properties by the coating layer in comparison to a case where a coating layer is not included.

Method of Manufacturing Ceramic Electronic Component

Hereinafter, a method of manufacturing a ceramic electronic component by which the ceramic electronic component 100 according to an exemplary embodiment in the present disclosure may be easily manufactured will be described.

However, it should be noted that the manufacturing method for manufacturing the ceramic electronic component 100 according to an exemplary embodiment in the present disclosure is not limited by a manufacturing method described below. In addition, a description for contents that are the same contents as described above will be omitted in order to avoid an overlapping description.

The method of manufacturing a ceramic electronic component according to an exemplary embodiment in the present disclosure may include: performing synthesis and grain growth of a dielectric material in an aqueous solution by heat treatment; cooling the aqueous solution and then adding a compound including a first element to the aqueous solution; forming a coating layer including the first element on a surface of the dielectric material by performing a heat treatment on the aqueous solution; drying the dielectric material on which the coating layer is formed to obtain a dielectric powder; forming a ceramic green sheet using the dielectric powder; printing a conductive paste for an internal electrode on the ceramic green sheet and then stacking the ceramic green sheets on which the conductive paste is printed to form a laminate; forming a body including dielectric layers and internal electrodes by sintering the laminate; and forming external electrodes on the body.

Dielectric Powder Production

First, a dielectric powder may be obtained using the method of producing a dielectric powder described above.

Specifically, a dielectric powder may be produced by: performing synthesis and grain growth of a dielectric material in an aqueous solution by heat treatment; cooling the aqueous solution and then adding a compound including a first element to the aqueous solution; forming a coating layer including the first element on a surface of the dielectric material by performing a heat treatment on the aqueous solution; and drying the dielectric material on which the coating layer is formed.

Figure 11:
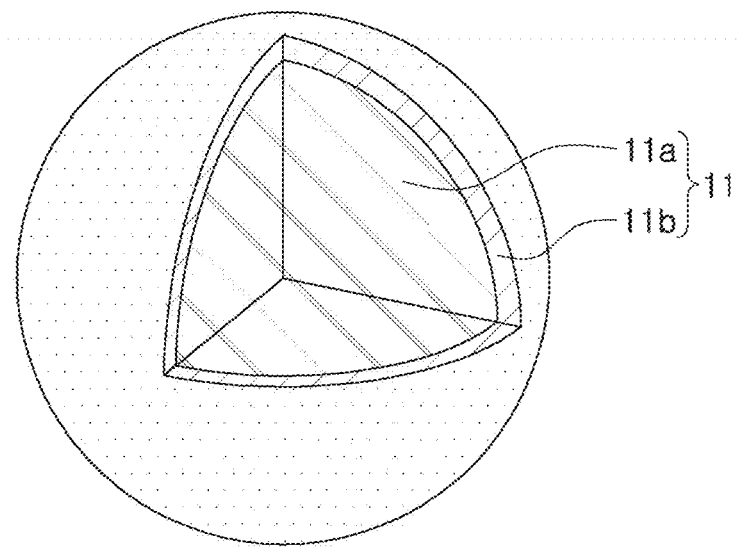
FIG. 11 illustrates a dielectric powder.

Referring to FIG. 11, a dielectric powder 11 may include a core 11a including a dielectric material and a coating layer 11b disposed on a surface of the core and including a first element. In this case, the coating layer 11b may be disposed on at least a portion of the surface of the core 11a.

In an exemplary embodiment, the dielectric material included in the core 11a may be $BaTiO_3$, the first element may be Si, and the coating layer 11b may include a composite phase of Ba and Si. In this case, the dielectric powder may be obtained by performing synthesis and grain growth of $BaTiO_3$ in an aqueous solution, adding a compound including Si to the aqueous solution, and then performing a heat treatment on the aqueous solution. As the coating layer 11b includes the composite phase of Ba and Si, a liquid phase may be easily formed during sintering of the dielectric, such that a shrinkage start temperature of the dielectric powder may be lowered and high reliability of the ceramic electronic component may be secured. In addition, as the coating layer 11b includes the composite phase of Ba and Si, a sintering end point may be delayed due to an increase in solid-solution temperature of the additive, such that a first secondary phase SE may be easily formed.

In this case, the coating layer 11b may further include one or more of Mg, Mn, Al, V, Ca, Li, Cu, Dy, Tb, Nb, Sm, and Gd.

In an exemplary embodiment, the dielectric material may be one or more of $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1$ and $0<y<1)$, and $Ba(Ti_{1-y}Zr_y)O_3$ $(0<y<1)$, and the first element may be one or more of Si, Mg, Mn, Al, V, Ca, Li, Cu, Dy, Tb, Nb, Sm, and Gd. In addition, the coating layer 11b may include a composite phase of Ba and a first element.

Ceramic Green Sheet Formation

Thereafter, a ceramic green sheet may be formed using the dielectric powder 11. For example, a ceramic green sheet may be formed by adding an additive to the dielectric powder 11, mixing ethanol and toluene as solvents with a dispersant, and then mixing a binder.

In an exemplary embodiment, a ceramic green sheet may be formed by adding the first element as an additive to the dielectric powder 11. For example, in a case where the first element included in the coating layer 11b is Si, a ceramic green sheet may be formed by adding Si as an additive to the dielectric powder 11. That is, the first element may be included in the coating layer of the dielectric powder, and the first element may be added or may be present as an additive when a ceramic green sheet is formed.

In this case, the compound including the first element may be $Si(OR)_4$.

In an exemplary embodiment, a dielectric powder 11 including a coating layer 11b formed on a surface of a dielectric material 11a' and including a composite phase of Ba and Si is used, such that a first secondary phase SE having a ratio of a major axis length to a minor axis length of 4 or more and including Ni, Mg, Al, Si, and O may be easily formed in the dielectric layer 111 after sintering. Meanwhile, Ni, Mg, and Al included in the first secondary phase SE may be included in the coating layer 11b of the dielectric powder 11, or may be added as a minor component. In addition, Ni included in the first secondary phase SE may be diffused Ni included in the internal electrodes.

In this case, the coating layer 11b may further include one or more additional elements of Mg, Mn, Al, V, Ca, Li, Cu, Dy, Tb, Nb, Sm, and Gd. In addition, the additional element may be present in the coating layer 11b in a form of a composite phase with Ba.

In an exemplary embodiment, the amount of Si (first element) included in the dielectric powder 11 may be 0.25 mol or more and 2.49 mol or less with respect to 100 mol of $BaTiO_3$. Therefore, the MTTF of the ceramic electronic component 100 may be improved. When the amount of Si exceeds 2.49 mol with respect to 100 mol of $BaTiO_3$, it may be difficult to produce a plurality of dielectric powder particles to have a uniform coating layer, or a production time and/or a production cost of the dielectric powder may be excessively required. In addition, as the amount of Si included in the dielectric powder 11 is 0.25 mol or more and 2.49 mol or less with respect to 100 mol of $BaTiO_3$, it may be easy to secure an area ratio of first secondary phases SE in a 10 μm×10 μm region located in a central portion of a cross section of the body 110 cut in first and second directions to 0.5% or more.

In an exemplary embodiment, the amount of Si (first element) included in the dielectric powder 11 may be 0.25 mol or more and 1.66 mol or less with respect to 100 mol of $BaTiO_3$. Therefore, the withstand voltage and the initial time to failure may be improved. In addition, as the amount of Si included in the dielectric powder 11 is 0.25 mol or more and 1.66 mol or less with respect to 100 mol of $BaTiO_3$, it may be easy to secure the area ratio of the first secondary phases SE in the 10 μm×10 μm region located in the central portion of the cross section of the body 110 cut in the first and second directions to 0.9% or more.

In an exemplary embodiment, the amount of Si (first element) included in the dielectric powder 11 may be 0.25 mol or more and 1.25 mol or less with respect to 100 mol of $BaTiO_3$. Therefore, the withstand voltage may be further improved, and the MTTF may be more significantly improved. In addition, as the amount of Si included in the dielectric powder 11 is 0.25 mol or more and 1.25 mol or less with respect to 100 mol of $BaTiO_3$, it may be easy to secure the area ratio of the first secondary phases SE in the 10 μm×10 μm region located in the central portion of the cross section of the body 110 cut in the first and second directions to 1.1% or more.

In an exemplary embodiment, the amount of Si included in the dielectric powder 11 may be 0.83 mol or more and 1.25 mol or less with respect to 100 mol of $BaTiO_3$. Therefore, the initial time to failure may be more significantly improved. In addition, as the amount of Si included in the dielectric powder 11 is 0.83 mol or more and 1.25 mol or less with respect to 100 mol of $BaTiO_3$, it may be easy to secure the area ratio of the first secondary phases SE in the 10 μm×10 μm region located in the central portion of the cross section of the body 110 cut in the first and second directions to 1.5% or more.

Laminate Formation

Next, a laminate may be formed by printing a conductive paste for an internal electrode on the ceramic green sheet and then stacking the ceramic green sheets on which the conductive paste is printed.

The conductive paste for an internal electrode may include one or more of nickel (Ni), copper (Cu), palladium (Pd), silver (Ag), gold (Au), platinum (Pt), tin (Sn), tungsten (W), titanium (Ti), and alloys thereof.

As a method of printing the conductive paste for an internal electrode, a screen-printing method, a gravure printing method, or the like may be used, but the present disclosure is not limited thereto.

Body Formation

Next, a body 110 including dielectric layers 111 and internal electrodes 121 and 122 may be formed by sintering the laminate.

In this case, the dielectric layer may include a plurality of first secondary phases, the first secondary phase is a secondary phase including Ni, Mg, Al, Si, and O, and at least one of the plurality of first secondary phases may have a ratio of a major axis length to a minor axis length of 4 or more.

In addition, the body 110 may have first and second surfaces opposing each other in the first direction, third and fourth surfaces connected to the first and second surfaces and opposing each other in the second direction, and fifth and sixth surfaces connected to the first to fourth surfaces and opposing each other in the third direction. A ratio of an area occupied by the first secondary phases in a 10 μm×10 μm region located in a central portion of a cross section of the body cut in the first and second directions may be 0.5% or more.

In an exemplary embodiment, the sintering may be performed in a gas atmosphere in which nitrogen ($N_2$) gas and 0.05 to 0.2 vol % of hydrogen ($H_2$) gas are mixed. Therefore, the first secondary phase SE may be more easily formed.

External Electrode Formation

Next, a ceramic electronic component 100 may be manufactured by forming external electrodes 131 and 132 on the body 110.

A method of forming the external electrodes 131 and 132 is not particularly limited. The external electrodes 131 and 132 may be formed by a method of dipping the body 110 in a paste including a conductive metal and glass or a method of transferring a sheet including a conductive metal to the body 110. In addition, the external electrodes may be formed using a paste including a conductive metal and a resin, an atomic layer deposition (ALD) method, a molecular layer deposition (MLD) method, a chemical vapor deposition (CVD) method, a sputtering method, or the like.

In addition, the external electrodes may include plating layers 131b and 132b by separately performing a plating process.

Experimental Examples

After synthesis and grain growth of $BaTiO_3$ were performed in an aqueous solution, $Si(OR)_4$ was added to the aqueous solution so that the amount of Si with respect to 100 mol of $BaTiO_3$ was the number of moles shown in Table 1. Thereafter, heat treatment and drying were performed, and then, a dielectric powder including a core including $BaTiO_3$ and a coating layer disposed on a surface of the core and including a composite phase of Ba and Si was produced. Thereafter, internal electrode patterns were formed by applying a conductive paste for an internal electrode including Ni to a ceramic green sheet manufactured using the dielectric powder. Next, a laminate obtained by stacking the ceramic green sheets on which the internal electrode patterns were formed was cut into a chip unit, and the chips were sintered, thereby manufacturing sample chips. However, in the case of Test No. 1, a $BaTiO_3$ powder in which a coating layer was not disposed was used, and $SiO_2$ was added as an additive when the ceramic green sheet was manufactured.

After an image of the dielectric powder of each Test No. was obtained at a magnification of 30 k by an SEM, the presence or absence of segregation of the dielectric powder particles was observed, Si mapping was performed by SEM-EDS or electron probe microanalysis-energy dispersive X-ray spectroscopy (EPMA-EDS), and a maximum size of a region in which Si agglomeration was present was measured. It was expressed by 0 when the maximum size was 100 nm or less, A when the maximum size exceeded 100 nm and 200 nm or less, and x when the maximum size exceeded 200 nm.

A coefficient of variation (CV) value of a dielectric grain size (GS CV) was calculated by measuring sizes of five hundred or more dielectric grains in an image obtained by scanning a central portion of a cross section of a body 110 of the sample chip cut in first and second directions.

After heat treatment was performed on ten sample chips for each Test No. at 150° C. for one hour, the sample chips were left at room temperature for 24 hours, and then, a dielectric constant was measured under conditions of 1 kHz and 0.5 Vrms.

An area ratio of first secondary phases SE was measured by SEM and SEM-EDS in a 10 μm×10 μm region located in a central portion of a cross section of the body 110 of the sample chip cut in the first and second directions. In addition, the presence or absence of a needle-shaped first secondary phase was expressed by o when the number of first secondary phases having a ratio of a major axis length to a minor axis length of 4 or more was one or more, and x when no first secondary phase having a ratio of a major axis length to a minor axis length of 4 or more was observed.

Withstand voltages of ten sample chips for each Test No. were measured under conditions of a set-up rate of 20 V/sec and a current limit of 20 mA.

In order to measure an initial time to failure and a mean time to failure (MTTF), an accelerated lifespan test was performed on four hundred sample chips for each Test No. under conditions of 105° C. and 12.6 V. The time when a sample chip having an insulation resistance measurement value of 10 kΩ or less was first observed was determined as the initial time to failure, and an average value of the times when an insulation resistance measurement value of each sample chip was 10 kΩ or less was determined as the MTTF.

TABLE 1

| | Dielectric powder | | Sample chip | | | | Reliability evaluation | | |
|---|---|---|---|---|---|---|---|---|---|
| Test No. | Si (mol) | Presence or absence of segregation | GS CV (%) | Dielectric constant | Area ratio of SE (%) | Needle-shaped SE | Withstand voltage (V) | Initial time to failure (hr) | MTTF (hr) |
| 1 | 0 | X | 0.28 | 1729 | 0 | X | 65 | 8.74 | 11.6 |
| 2 | 0.25 | X | 0.2 | 1767 | 1.1 | ○ | 80 | 10.49 | 36.2 |
| 3 | 0.83 | X | 0.18 | 1773 | 1.5 | ○ | 88 | 19.3 | 38 |
| 4 | 1.25 | X | 0.21 | 1770 | 1.6 | ○ | 73 | 18.4 | 35 |
| 5 | 1.66 | X | 0.29 | 1728 | 0.9 | ○ | 67 | 11.03 | 21.6 |
| 6 | 2.49 | Δ | 0.34 | 1729 | 0.5 | ○ | 65 | 8.55 | 17.3 |
| 7 | 3.32 | ○ | 0.37 | 1690 | 0.1 | X | 61 | 5.32 | 10.3 |

In the sample chip of Test No. 1, no secondary phase including Ni, Mg, Al, Si, and O (first secondary phase SE) was observed, and the MTTF was deteriorated. In addition, in all the secondary phases observed in the sample chip of Test No. 1, the ratio of the major axis length to the minor axis length was less than 4, and no needle-shaped secondary phase was observed.

In the cases of Test Nos. 2 to 6, it could be confirmed that the area ratio of SE in the 10 μm×10 μm region was 0.5% or more and the MTTF was significantly improved in comparison to that in Test No. 1.

In addition, in the cases of Test Nos. 2 to 5 in which the area ratio of SE in the 10 μm×10 μm region was 0.9% or more, it could be confirmed that the withstand voltage and the initial time to failure were increased in comparison to those in Test No. 1.

In addition, in the cases of Test Nos. 2 to 4 in which the area ratio of SE in the 10 μm×10 μm region was 1.1% or more, it could be confirmed that a more significant effect was obtained because the MTTF was 30 hr or longer, which was increased by three times or more in comparison to that in Test No. 1.

In addition, in the cases of Test Nos. 3 and 4 in which the area ratio of SE in the 10 μm×10 μm region was 1.5% or more, it could be confirmed that the withstand voltage and the initial time to failure were also significantly increased in comparison to those in other Test Nos.

However, in the case of Test No. 7, the first secondary phase was observed, but no needle-shaped secondary phase was observed, and as a result, the MTTF was not improved.

FIGS. 6A through 6E are images obtained by analyzing the cross section of the sample chip of Test No. 1 by SEM-EDS. FIGS. 7A through 7E are images obtained by analyzing the cross section of the sample chip of Test No. 2 by SEM-EDS. FIGS. 8A through 8E are images obtained by analyzing the cross section of the sample chip of Test No. 3 by SEM-EDS. FIGS. 9A through 9E are images obtained by analyzing the cross section of the sample chip of Test No. 4 by SEM-EDS. In FIGS. 6A through 9E, (a) is a mapping image of Ni, (b) is a mapping image of Mg, (c) is a mapping image of Al, (d) is a mapping image of Si, (e) is a mapping image of O, and the presence or absence and concentration of each element may be confirmed.

In addition, Table 2 shows the minor axis length, the major axis length, and the ratio of the major axis length to the minor axis length of each of the secondary phases observed in FIGS. 6A through 9E. In Table 2, the major axis and the minor axis represent the major axis length and the minor axis length, respectively, a unit of the axis length is nm, and the value obtained by dividing the major axis length by the minor axis length is represented by the ratio. In the case of Test No. 1, the major axes and the minor axes of all the secondary phases observed were measured, and in the cases of Test Nos. 2 to 4, the major axes and the minor axes of the secondary phases including Ni, Mg, Al, Si, and O (first secondary phases SE) were measured.

TABLE 2

| | Test No. 1 | | | Test No. 2 | | | Test No. 3 | | | Test No. 4 | | |
|---|---|---|---|---|---|---|---|---|---|---|---|---|
| Classification | Major axis | Minor axis | Ratio | Major axis | Minor axis | Ratio | Major axis | Minor axis | Ratio | Major axis | Minor axis | Ratio |
| 1 | 144 | 144 | 1.00 | 206 | 173 | 1.19 | 513 | 406 | 1.26 | 144 | 80 | 1.79 |
| 2 | 144 | 122 | 1.18 | 305 | 173 | 1.76 | 464 | 356 | 1.30 | 419 | 230 | 1.82 |
| 3 | 122 | 96 | 1.27 | 913 | 265 | 3.45 | 446 | 159 | 2.80 | 210 | 102 | 2.06 |
| 4 | 169 | 122 | 1.39 | 542 | 136 | 4.00 | 529 | 113 | 4.70 | 331 | 130 | 2.56 |
| 5 | 367 | 217 | 1.69 | 746 | 169 | 4.40 | 680 | 113 | 6.04 | 219 | 80 | 2.72 |
| 6 | 169 | 96 | 1.77 | 725 | 140 | 5.18 | 1012 | 113 | 8.99 | 281 | 102 | 2.76 |
| 7 | 273 | 144 | 1.90 | 655 | 122 | 5.36 | 1083 | 120 | 13.60 | 219 | 72 | 3.04 |
| 8 | 290 | 152 | 1.91 | 410 | 76 | 5.40 | 1898 | 128 | 14.79 | 309 | 102 | 3.04 |
| 9 | 198 | 96 | 2.06 | 749 | 136 | 5.52 | 1882 | 118 | 15.90 | 395 | 108 | 3.67 |
| 10 | 169 | 76 | 2.24 | 516 | 76 | 6.81 | 1744 | 107 | 16.33 | 399 | 104 | 3.85 |
| 11 | 217 | 96 | 2.26 | 937 | 92 | 10.20 | | | | 382 | 80 | 4.75 |
| 12 | 217 | 96 | 2.26 | 1333 | 122 | 10.91 | | | | 905 | 183 | 4.94 |
| 13 | 303 | 122 | 2.48 | | | | | | | 579 | 102 | 5.70 |
| 14 | 472 | 183 | 2.59 | | | | | | | 708 | 114 | 6.23 |
| 15 | 198 | 76 | 2.61 | | | | | | | 733 | 114 | 6.45 |
| 16 | 198 | 76 | 2.61 | | | | | | | 703 | 102 | 6.92 |
| 17 | 307 | 107 | 2.86 | | | | | | | 703 | 89 | 7.94 |
| 18 | 313 | 107 | 2.92 | | | | | | | 620 | 78 | 8.00 |
| 19 | 203 | 68 | 3.00 | | | | | | | 1043 | 98 | 10.66 |
| 20 | 320 | 96 | 3.34 | | | | | | | 632 | 61 | 10.29 |
| 21 | 258 | 76 | 3.41 | | | | | | | 563 | 56 | 10.03 |

TABLE 2-continued

| Classification | Test No. 1 | | | Test No. 2 | | | Test No. 3 | | | Test No. 4 | | |
|---|---|---|---|---|---|---|---|---|---|---|---|---|
| | Major axis | Minor axis | Ratio | Major axis | Minor axis | Ratio | Major axis | Minor axis | Ratio | Major axis | Minor axis | Ratio |
| 22 | 173 | 48 | 3.61 | | | | | | | 590 | 56 | 10.52 |
| 23 | 285 | 73 | 3.92 | | | | | | | 859 | 77 | 11.14 |
| 24 | | | | | | | | | | 836 | 73 | 11.45 |
| 25 | | | | | | | | | | 1019 | 86 | 11.90 |
| 26 | | | | | | | | | | 937 | 72 | 13.00 |
| 27 | | | | | | | | | | 1004 | 72 | 13.95 |
| 28 | | | | | | | | | | 857 | 57 | 15.00 |
| 29 | | | | | | | | | | 1116 | 72 | 15.53 |

In the case of Test No. 1, all secondary phases had a ratio of a major axis length to a minor axis length of less than 4, the Si—O secondary phase, the Al—Si—O secondary phase, and the Ni—Mg—O secondary phase were observed, and among the observed secondary phases, there was no secondary phase including Ni, Mg, Al, Si, and O (first secondary phase SE).

In the case of Test No. 2, twelve first secondary phases SE were observed, and it was observed that, among the twelve first secondary phases, the number of secondary phases having a ratio of a major axis length to a minor axis length of 4 or more was nine and the number of secondary phases having a ratio of a major axis length to a minor axis length of 10 or more was two. In addition, it was confirmed that in the 10 μm×10 μm region, the area ratio of the first secondary phases was 1.1%, and among the first secondary phases, the area ratio of the secondary phases having a ratio of a major axis length to a minor axis length of 4 or more was 0.7% and the area ratio of the secondary phases having a ratio of a major axis length to a minor axis length of 10 or more was 0.2%.

In the case of Test No. 3, ten first secondary phases SE were observed, and it was observed that, among the ten first secondary phases, the number of secondary phases having a ratio of a major axis length to a minor axis length of 4 or more was seven and the number of secondary phases having a ratio of a major axis length to a minor axis length of 10 or more was four. In addition, it was confirmed that in the 10 μm×10 μm region, the area ratio of the first secondary phases was 1.5%, and among the first secondary phases, the area ratio of the secondary phases having a ratio of a major axis length to a minor axis length of 4 or more was 0.9% and the area ratio of the secondary phases having a ratio of a major axis length to a minor axis length of 10 or more was 0.7%.

In the case of Test No. 4, twenty nine first secondary phases SE were observed, and it was observed that, among the twenty nine first secondary phases, the number of secondary phases having a ratio of a major axis length to a minor axis length of 4 or more was nineteen and the number of secondary phases having a ratio of a major axis length to a minor axis length of 10 or more was eleven. In addition, it was confirmed that in the 10 μm×10 μm region, the area ratio of the first secondary phases was 1.6%, and among the first secondary phases, the area ratio of the secondary phases having a ratio of a major axis length to a minor axis length of 4 or more was 1.2% and the area ratio of the secondary phases having a ratio of a major axis length to a minor axis length of 10 or more was 0.5%.

Therefore, in the case where a plurality of first secondary phases SE were included in the dielectric layer 111 and one or more needle-shaped first secondary phases were included in the dielectric layer 111, it could be confirmed that the MTTF was significantly improved, such that the reliability of the ceramic electronic component was improved.

In addition, as a result of comparing the dielectric powder particles of Test Nos. 1 to 7 shown in Table 1, as the amount of Si included in the coating layer of the dielectric powder was increased, the number of first secondary phases SE tended to be increased, but in the case where the amount of Si included in the coating layer of the dielectric powder was 1.66 mol or more, the number of first secondary phases SE tended to be decreased again. This is interpreted as non-uniform Si distribution due to an increase in amount of Si. In the case of Test No. 6 in which the amount of Si was 2.49 mol, the maximum size of the region in which Si agglomeration was present exceeded 100 nm, and in the case of Test No. 7 in which the amount of Si was 3.32 mol, the maximum size of the region in which Si agglomeration was present exceeded 200 nm, and thus, the Si distribution was non-uniform.

FIG. 12A is an image obtained by observing the dielectric powder particles of Test No. 7 by SEM, and FIG. 12B is an image obtained by analyzing the Si distribution by SEM-EDS. FIG. 13A is an image obtained by observing the dielectric powder particles of Test No. 3 by SEM, and FIG. 13B is an image obtained by analyzing the Si distribution by SEM-EDS. In FIGS. 12A and 12B, it may be confirmed that Si segregation occurs because the maximum size of the region in which Si agglomeration is present exceeds 200 nm. On the other hand, in FIGS. 13A and 13B, it may be confirmed that Si elements are significantly uniformly distributed because a region in which Si agglomeration is present is hardly observed.

As set forth above, according to an exemplary embodiment in the present disclosure, the dielectric layer includes a plurality of first secondary phases including Ni, Mg, Al, Si, and O, and at least one of the plurality of first secondary phases has a ratio of a major axis length to a minor axis length of 4 or more, such that the reliability of the ceramic electronic component may be improved.

According to an exemplary embodiment in the present disclosure, the grain growth of the dielectric material is performed in the aqueous solution, the coating material is added to the aqueous solution, and the dispersion and coating are performed by heat treatment, such that the additives may be uniformly distributed throughout a plurality of dielectric powder particles to be produced.

While exemplary embodiments have been shown and described above, it will be apparent to those skilled in the art that modifications and variations could be made without departing from the scope of the present invention as defined by the appended claims.

What is claimed is:

1. A ceramic electronic component comprising:
a body including dielectric layers and internal electrodes; and
external electrodes disposed on the body and connected to the internal electrodes,
wherein at least one of the dielectric layers includes first secondary phases,
the first secondary phases consist of a secondary phase including Ni, Mg, Al, Si, and O, and
at least one of the first secondary phases has a ratio of a major axis length to a minor axis length of 10 or more.

2. The ceramic electronic component of claim 1, wherein the body has first and second surfaces opposing each other in a first direction, third and fourth surfaces connected to the first and second surfaces and opposing each other in a second direction, and fifth and sixth surfaces connected to the first to fourth surfaces and opposing each other in a third direction, and
among the first secondary phases present in a 10 μm×10 μm region located in a central portion of a cross section of the body cut in the first and second directions, a number of first secondary phases having the ratio of the major axis length to the minor axis length of 4 or more is six or more.

3. The ceramic electronic component of claim 2, wherein among the first secondary phases present in the 10 μm×10 μm region, a number of first secondary phases having the ratio of the major axis length to the minor axis length of 10 or more is two or more.

4. The ceramic electronic component of claim 2, wherein at least one of the internal electrodes has a disconnected portion in the cross section of the body cut in the first and second directions, and the at least one of the first secondary phases is disposed to penetrate through the disconnected portion.

5. The ceramic electronic component of claim 1, wherein the body has first and second surfaces opposing each other in a first direction, third and fourth surfaces connected to the first and second surfaces and opposing each other in a second direction, and fifth and sixth surfaces connected to the first to fourth surfaces and opposing each other in a third direction, and
a ratio of an area occupied by the first secondary phases in a 10 μm×10 μm region located in a central portion of a cross section of the body cut in the first and second directions is 0.5% or more.

6. The ceramic electronic component of claim 5, wherein the ratio of the area occupied by the first secondary phases in the 10 μm×10 μm region is 0.9% or more.

7. The ceramic electronic component of claim 5, wherein the ratio of the area occupied by the first secondary phases in the 10 μm×10 μm region is 1.1% or more.

8. The ceramic electronic component of claim 5, wherein a ratio of the area occupied by the first secondary phases to an area occupied by the dielectric layers in the 10 μm×10 μm region is 1.0% or more.

9. The ceramic electronic component of claim 1, wherein the at least one of the dielectric layers further includes one or more second secondary phases,
the one or more second secondary phases consist of a secondary phase that is free of one or more of Ni, Mg, Al, Si, and O, and
a ratio of a number of first secondary phases to a number of all secondary phases present in the at least one of the dielectric layers is 30% or more and less than 100%.

10. The ceramic electronic component of claim 1, wherein the at least one of the first secondary phases is disposed to be partially in contact with at least one of the internal electrodes.

11. The ceramic electronic component of claim 1, wherein the at least one of the first secondary phases is disposed at an interface between one of the internal electrodes and one of the dielectric layers.

12. The ceramic electronic component of claim 1, wherein an average thickness of each of the dielectric layers is 0.4 μm or less.

13. The ceramic electronic component of claim 1, wherein an average thickness of each of the internal electrodes is 0.4 μm or less.

14. The ceramic electronic component of claim 1, wherein the at least one of the dielectric layers further includes dielectric grains, and a coefficient of variation (CV) value of a dielectric grain size is 0.21% or less.

15. A ceramic electronic component comprising:
a body including dielectric layers and internal electrodes stacked in a first direction; and
external electrodes disposed on surfaces of the body opposing in a second direction and connected to the internal electrodes,
wherein at least one of the dielectric layers includes first secondary phases,
the first secondary phases consist of a secondary phase including Ni, Mg, Al, Si, and O, and
a ratio of an area occupied by the first secondary phases in a 10 μm×10 μm region located in a central portion of a cross section of the body cut along the first and second directions is more than 0.5%,
wherein the at least one of the dielectric layers further includes dielectric grains, and a coefficient of variation (CV) value of a dielectric grain size is 0.21% or less.

16. The ceramic electronic component of claim 15, wherein the ratio of the area occupied by the first secondary phases in the 10 μm×10 μm region is more than 0.5% and 3.0% or less.

17. The ceramic electronic component of claim 16, wherein the ratio of the area occupied by the first secondary phases in the 10 μm×10 μm region is 0.9% or more and 3.0% or less.

18. The ceramic electronic component of claim 16, wherein the ratio of the area occupied by the first secondary phases in the 10 μm×10 μm region is 1.1% or more and 3.0% or less.

19. The ceramic electronic component of claim 15, wherein at least one of the first secondary phases has a ratio of a major axis length to a minor axis length of 4 or more.

20. The ceramic electronic component of claim 15, wherein at least one of the first secondary phases has the ratio of the major axis length to the minor axis length of 10 or more.

* * * * *